US011396930B2

(12) United States Patent
Aitcin et al.

(10) Patent No.: US 11,396,930 B2
(45) Date of Patent: Jul. 26, 2022

(54) DRIVE PULLEY FOR A CONTINUOUSLY VARIABLE TRANSMISSION

(71) Applicant: BOMBARDIER RECREATIONAL PRODUCTS INC., Valcourt (CA)

(72) Inventors: Xavier-Pierre Aitcin, St-Hyacinthe (CA); Catherine Geoffroy, Sainte-Catherine-de-Hatley (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 327 days.

(21) Appl. No.: 16/555,737

(22) Filed: Aug. 29, 2019

(65) Prior Publication Data

US 2020/0072325 A1 Mar. 5, 2020

Related U.S. Application Data

(60) Provisional application No. 62/725,547, filed on Aug. 31, 2018.

(51) Int. Cl.
| | |
|---|---|
| *F16H 9/14* | (2006.01) |
| *F16H 55/56* | (2006.01) |
| *B62D 63/02* | (2006.01) |
| *B62M 9/06* | (2006.01) |
| *B60K 17/06* | (2006.01) |
| *B60K 5/00* | (2006.01) |
| *F16H 55/36* | (2006.01) |

(52) U.S. Cl.
CPC ............. *F16H 9/14* (2013.01); *B62D 63/02* (2013.01); *B62M 9/06* (2013.01); *F16H 55/56* (2013.01); *F16H 55/563* (2013.01); *B60K 5/00* (2013.01); *B60K 17/06* (2013.01); *F16H 55/36* (2013.01)

(58) Field of Classification Search
CPC ................. F16H 55/563; F16H 63/067; F16H 61/66245; F16H 9/18
USPC ........................................................... 474/13
See application file for complete search history.

(56) References Cited

U.S. PATENT DOCUMENTS

| | | | | |
|---|---|---|---|---|
| 3,659,470 A | * | 5/1972 | Beaudoin .............. | F16H 55/563 474/13 |
| 3,680,403 A | * | 8/1972 | Schupan ........... | F16H 61/66245 474/13 |
| 3,757,593 A | * | 9/1973 | Svenson ........... | F16H 61/66227 474/12 |
| 3,808,900 A | * | 5/1974 | Vadeboncoeur ...... | F16H 55/563 474/13 |

(Continued)

*Primary Examiner* — Henry Y Liu
(74) *Attorney, Agent, or Firm* — BCF LLP

(57) ABSTRACT

A drive pulley for a continuously variable transmission (CVT) has a pulley shaft with a fixed sheave, a movable sheave and a back plate thereon. The movable sheave has a movable sheave surface with first and second surface portions that faces the back plate. A biasing member biases the sheaves away from each other. A slider is disposed between the back plate and the movable sheave. The slider has a flat engagement zone surface, and a curved driving zone surface extending outward from the engagement zone surface. From rest, as the pulley shaft accelerates, the engagement zone surface of the slider slides radially outward against the first portion of the movable sheave surface and then the driving zone surface of the slider slides radially outward against the second portion of the movable sheave thereby pushing the movable sheave toward the fixed sheave. A vehicle having the CVT is also disclosed.

20 Claims, 15 Drawing Sheets

(56) References Cited

U.S. PATENT DOCUMENTS

| | | | | |
|---|---|---|---|---|
| 3,824,867 A * | 7/1974 | Brooks | F16H 61/66245 | 474/13 |
| 4,102,214 A * | 7/1978 | Hoff | F16H 55/563 | 474/12 |
| 4,178,808 A * | 12/1979 | Bacher | F16H 55/563 | 267/161 |
| 4,179,946 A * | 12/1979 | Kanstoroom | F16H 61/66245 | 474/13 |
| 5,052,981 A * | 10/1991 | Robert | F16H 55/563 | 474/14 |
| 5,108,347 A * | 4/1992 | Gourdon | F16H 55/563 | 474/13 |
| 5,188,568 A * | 2/1993 | Gourdon | F16H 55/563 | 474/13 |
| 5,328,413 A * | 7/1994 | Robert | F16H 55/563 | 474/13 |
| 5,458,539 A * | 10/1995 | Landry | F16H 55/563 | 474/13 |
| 6,520,878 B1 * | 2/2003 | Leclair | F16H 55/563 | 474/12 |
| 7,172,523 B2 * | 2/2007 | Borghi | F16H 55/563 | 192/3.54 |
| 7,204,771 B2 * | 4/2007 | Gu | F16H 9/16 | 474/13 |
| 7,276,004 B2 * | 10/2007 | Wu | F16H 55/563 | 474/13 |
| 7,803,074 B2 * | 9/2010 | Ishida | F16H 63/067 | 474/8 |
| 8,105,190 B2 * | 1/2012 | Galletti | F16H 61/66268 | 474/13 |
| 10,422,417 B2 * | 9/2019 | Wu | F16H 9/12 | |
| 10,830,350 B2 * | 11/2020 | Wu | F16H 29/12 | |
| 2001/0039222 A1 * | 11/2001 | Mukai | F16H 55/563 | 474/12 |
| 2004/0082415 A1 * | 4/2004 | Borghi | F16H 55/563 | 474/13 |
| 2004/0171443 A1 * | 9/2004 | Borghi | F16D 43/08 | 474/12 |
| 2005/0064968 A1 * | 3/2005 | Robert | F16H 61/66245 | 474/13 |
| 2018/0355966 A1 * | 12/2018 | Mariotti | F16H 55/563 | |

* cited by examiner

DRIVE PULLEY FOR A CONTINUOUSLY VARIABLE TRANSMISSION

CROSS REFERENCE

The present application claims priority to U.S. Provisional Patent Application No. 62/725,547 filed Aug. 31, 2018, the entirety of which is incorporated herein by reference.

TECHNOLOGICAL FIELD

The present technology relates to drive pulleys for a continuously variable transmissions (CVT).

BACKGROUND

CVTs are often used to operatively connect a motor of a vehicle to one or more wheels of the vehicle for transferring torque thereto. To this end, a CVT typically includes a drive pulley operatively connected to a crankshaft of the motor, and a driven pulley operatively connected to the one or more wheels. A CVT belt is looped around the drive pulley and the driven pulley to selectively transfer torque therebetween.

In a "neutral" position of the CVT, the drive pulley is disengaged from the CVT belt and does not transfer torque from the motor thereto. As the motor accelerates, the drive pulley starts engaging the CVT belt and transferring torque to the CVT belt for propelling the vehicle.

More particularly, the drive pulley typically has a fixed sheave and a movable sheave which is movable relative to the fixed sheave.

As the motor rotationally accelerates the drive pulley above a threshold rotational speed, the movable sheave starts moving closer to the fixed sheave until it pinches the CVT belt against the fixed sheave and entrains the CVT belt, thereby transferring torque thereto.

As the motor rotates the drive pulley faster and faster, the movable sheave moves closer and closer to the fixed sheave, thereby closing the drive pulley further and increasing its effective radius. As the drive pulley closes, the driven pulley opens thereby decreasing the effective radius of the driven pulley to accommodate for the effectively constant length of the CVT belt and the torque being applied to the driven pulley by the drivetrain of the vehicle.

The closing action of the drive pulley accompanied by the opening action of the driven pulley during acceleration of the drive pulley by the motor, and an opening action of the drive pulley accompanied by a closing action of the driven pulley during deceleration of the motor, changes the effective gear ratio between the crankshaft of the motor and the one or more wheels of the vehicle.

There are a few different types of drive pulleys, including hydraulically actuated drive pulleys, pivotable weight type drive pulleys, and slider-type drive pulleys. Each type of drive pulley has its advantages and disadvantages.

For example, hydraulically actuated drive pulleys are typically used in cars, and require relatively complex and expensive hydraulic actuation and control systems.

Pivotable weight type drive pulleys are generally less expensive than hydraulically actuated drive pulleys but offer less control than hydraulically actuated drive pulleys.

Pivotable weight type drive pulleys use weights in the form of levers. Each such lever pivots radially outward from an axis of rotation of the drive pulley about a respective pivot axis as a result of centrifugal forces acting on the lever as the drive pulley rotationally accelerates. Pivoting of the levers of the drive pulley moves the movable sheave of the drive pulley toward the fixed sheave of the drive pulley and thereby gradually closes the drive pulley.

In some pivotable weight type drive pulleys, the levers are shaped so as to provide a pinching force profile whereby the pinching force applied by the drive pulley to the CVT belt increases as the drive pulley starts engaging the CVT belt from the "neutral" position. The pinching force then reaches an "apex" and thereafter starts to decrease. Such pinching force profiles provide for relatively smooth engagement of the drive pulley with the CVT belt in some applications. However, pivotable weight type drive pulleys have a lot of parts which makes their assembly complex and are therefore relatively expensive to manufacture.

Slider-type centrifugal drive pulleys are generally cheaper to manufacture than pivotable weight type drive pulleys, but have drawbacks in some applications in comparison with pivotable weight type drive pulleys.

One such drawback is that slider-type centrifugal drive pulleys typically provide a pinching force profile whereby the pinching force applied by the drive pulley to the CVT belt starts to decrease as soon as the drive pulley starts engaging the CVT belt from the "neutral" position. Another drawback is that slider-type centrifugal drive pulleys typically have more friction associated with them.

FIG. 13 shows an example of such a pinching force profile. A pinching force applied by the prior art slider-type drive pulley to the CVT belt at the point where the drive pulley starts engaging the CVT belt is shown with reference letter "A". A pinching force applied by the drive pulley to the CVT belt in a most-closed position thereof is shown with reference letter "B".

In some applications and driving conditions, such pinching force profiles provide a relatively less smooth engagement of the drive pulley with the CVT belt from the drive pulley's "neutral" position. In some cases where the CVT is used in a vehicle, this can cause a jerky initial movement of the vehicle.

However, slider-type centrifugal drive pulleys are relatively less complex than their counterparts, which makes them interesting from a manufacturing perspective. There is therefore a desire for a slider-type centrifugal pulley that addresses the above-mentioned drawbacks.

SUMMARY

In view of the above, there is a desire for a slider-type centrifugal drive pulley that provides a pinching force profile that resembles the pinching force profiles provided by pivoting-weight type drive pulleys.

The present technology provides a slider-type centrifugal drive pulley that provides a pinching force profile having an apex so as to resemble pinching force profiles provided by pivoting-weight type drive pulleys. A pinching force profile provided by one particular embodiment of the drive pulley of the present technology is shown in FIG. 14.

The drive pulley of the present technology has a movable sheave with first and second surface portions against which the slider slides as it moves out radially. The slider has a flat engagement zone surface and a curved driving zone surface. Initially, as the drive pulley starts to rotated, the slider starts to slide radially outward with the flat engagement zone surface of the slider sliding against the first surface portion of the movable sheave. As the drive pulley rotates faster and faster, the slider continues to slider radially outward, but it is the curved driving zone surface of the slider that slides against the second surface portion of the movable sheave. As the slider slides radially outward, the movable sheave moves toward the fixed sheave. The change from the flat engagement zone surface engaging the first surface portion to the curved driving zone surface engaging the second surface portion results in pinching force profile of the drive pulley that has an apex.

More particularly, according to an aspect of the present technology, there is provided a drive pulley for a continuously variable transmission (CVT). The drive pulley includes a pulley shaft, a fixed sheave fixedly connected on the pulley shaft, a back plate fixedly connected on the pulley shaft, the back plate including a back plate surface facing the fixed sheave, and a movable sheave disposed on the pulley shaft axially between the back plate and the fixed sheave.

The movable sheave has a movable sheave surface facing the back plate surface. The movable sheave surface has a first surface portion and a second surface portion axially outward from the first surface portion. The movable sheave is slidable along the pulley shaft. The fixed sheave, the movable sheave and the back plate are rotatable together with the pulley shaft.

The drive pulley further includes a biasing member biasing the movable sheave away from the fixed sheave, and a slider disposed between the back plate surface and the movable sheave surface. The slider has a back plate contacting surface contacting the back plate surface, a flat engagement zone surface, and a curved driving zone surface extending radially outward from the engagement zone surface.

The slider is movable radially in response to rotation of the pulley shaft between a first position, a second position and a third position. The second position is radially outward from the first position. The third position is radially outward from the second position. Movement of the slider from the first position to the second position moves the movable sheave toward the fixed sheave. Movement of the slider from the second position to the third position moves the movable sheave toward the fixed sheave. When the slider moves between the first and second positions, the back plate contacting surface of the slider slides along the back plate surface of the back plate, and the engagement zone surface of the slider slides along the first surface portion of the movable sheave surface of the movable sheave. When the slider moves between the second and third positions: the back plate contacting surface of the slider slides along the back plate surface of the back plate, and the driving zone surface of the slider slides along the second surface portion of the movable sheave surface of the movable sheave.

In some embodiments, the driving zone surface of the slider is out of contact with the movable sheave surface when the slider is between the first position and the second position.

In some embodiments, the engagement zone surface of the slider is out of contact with the movable sheave surface when the slider is between the second position and the third position.

In some embodiments, the first surface portion of the movable sheave surface is a flat portion, the second surface portion of the movable sheave surface is a curved portion, and the curved portion extends toward the back plate as the curved portion extends radially away from the pulley shaft.

In some embodiments, the engagement zone surface of the slider is parallel to the flat portion of the movable sheave surface.

In some embodiments, the back plate surface extends toward the fixed sheave as the back plate surface extends radially away from the pulley shaft, the back plate contacting surface of the slider extends toward the fixed sheave as the back plate contacting surface extends radially away from the pulley shaft, the engagement zone surface of the slider extends toward the back plate as the engagement zone surface extends radially away from the pulley shaft, and the flat portion of the movable sheave surface extends toward the back plate as the flat portion extends radially away from the pulley shaft.

In some embodiments, the movable sheave and the fixed sheave are adapted to receive a belt therebetween and for applying a pinching force on the belt. In such embodiments, the pinching force increases as the slider moves from the first position to the second position, and decreases as the slider moves from the second position to the third position.

In some embodiments, the slider defines a cavity therein and has a weight removably received in the cavity.

In some embodiments, the slider defines an aperture therein, the aperture communicating with the cavity and being sized to receive a tool therein for pushing the weight out of the cavity.

In some embodiments, the back plate defines a radially extending rib extending along the back plate surface, the slider defines a recess in the back plate contacting surface of the slider, and the rib is received in the recess, the rib guiding the slider along the back plate surface as the slider slides along to the back plate surface.

In some embodiments, the drive pulley further includes a damper disposed between the back plate and the movable sheave for transferring rotational forces from the back plate to the movable sheave.

In some embodiments, the damper is a plurality of dampers. Each damper of the plurality of dampers defines a recess. The back plate defines a plurality of recesses. Each recess of the plurality of recesses of the back plate receives a corresponding damper of the plurality dampers therein. The movable sheave defines a plurality of ribs. Each rib of the plurality of ribs of the movable sheave is received in the recess of a corresponding one of the plurality of dampers. The plurality of dampers slide relative to the plurality of ribs of the movable sheave as the movable sheave moves along the pulley shaft.

In some embodiments, the driving zone surface of the slider is convex and the second surface portion of the movable sheave surface is concave.

In some embodiments, the biasing member is a spring disposed around the pulley shaft and disposed at least partially radially between the pulley shaft and the movable sheave.

In some embodiments, the slider is a plurality of sliders. The plurality of sliders is distributed circumferentially about the pulley shaft. In such embodiments, the movable sheave surface is a plurality of movable sheave surfaces. The plurality of movable sheave surfaces are distributed circumferentially about the pulley shaft. Similarly, the back plate surface is a plurality of back plate surfaces. The plurality of back plate surfaces are distributed circumferentially about the pulley shaft. In such embodiments, each slider of the plurality of sliders is disposed between a corresponding back plate surface of the plurality of back plate surfaces and a corresponding movable sheave surface of the plurality of movable sheave surfaces.

According to an aspect of the present technology, there is provided a continuously variable transmission (CVT). The CVT includes the drive pulley, a driven pulley, and a CVT belt looped around the drive pulley and the driven pulley to transfer torque therebetween.

According to yet an aspect of the present technology, there is provided a vehicle. The vehicle includes a motor, at least one ground engaging member, and the CVT, the CVT being operatively connected between the motor and the at least one ground engaging member.

According to an aspect of the present technology, there is provided a slider for a drive pulley of a continuously variable transmission (CVT). The slider includes a body having an inward side, an outward side, and a back plate contacting surface for contacting a back plate surface of a back plate of the drive pulley, the back plate contacting surface extending from the inward side toward the outward side. The body further includes a flat engagement zone surface for contacting a movable sheave of the drive pulley, the flat engagement zone surface being opposite the back plate contacting surface and extending from the inward side toward the outward side and toward the back plate contacting surface. The body further includes a curved driving zone surface extending from the engagement zone surface to the outward side and toward the back plate contacting surface.

In some embodiments, the slider defines a cavity in the body thereof, and the slider comprises a weight removably received in the cavity.

In some embodiments, the slider defines an aperture therein, the aperture communicating with the cavity and being sized to receive a tool therein for pushing the weight out of the cavity.

For purposes of this application, terms related to spatial orientation such as forward, rearward, upward, downward, left, and right, as they are used in this document refer to general directions as would be understood by a driver of a vehicle sitting in a driver seat of the vehicle and facing in a straight forward driving direction.

Terms related to spatial orientation when describing or referring to components or sub-assemblies of a vehicle separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a four-wheeled straddle-seat all-terrain vehicle (ATV) 9. However, it is contemplated that aspects of the present technology could be used in other types of vehicles, including two-wheeled, three-wheeled, and four-wheeled vehicles having a straddle seat or another type of seat, or in other applications using a continuously variable transmission (CVT).

Figure 1:
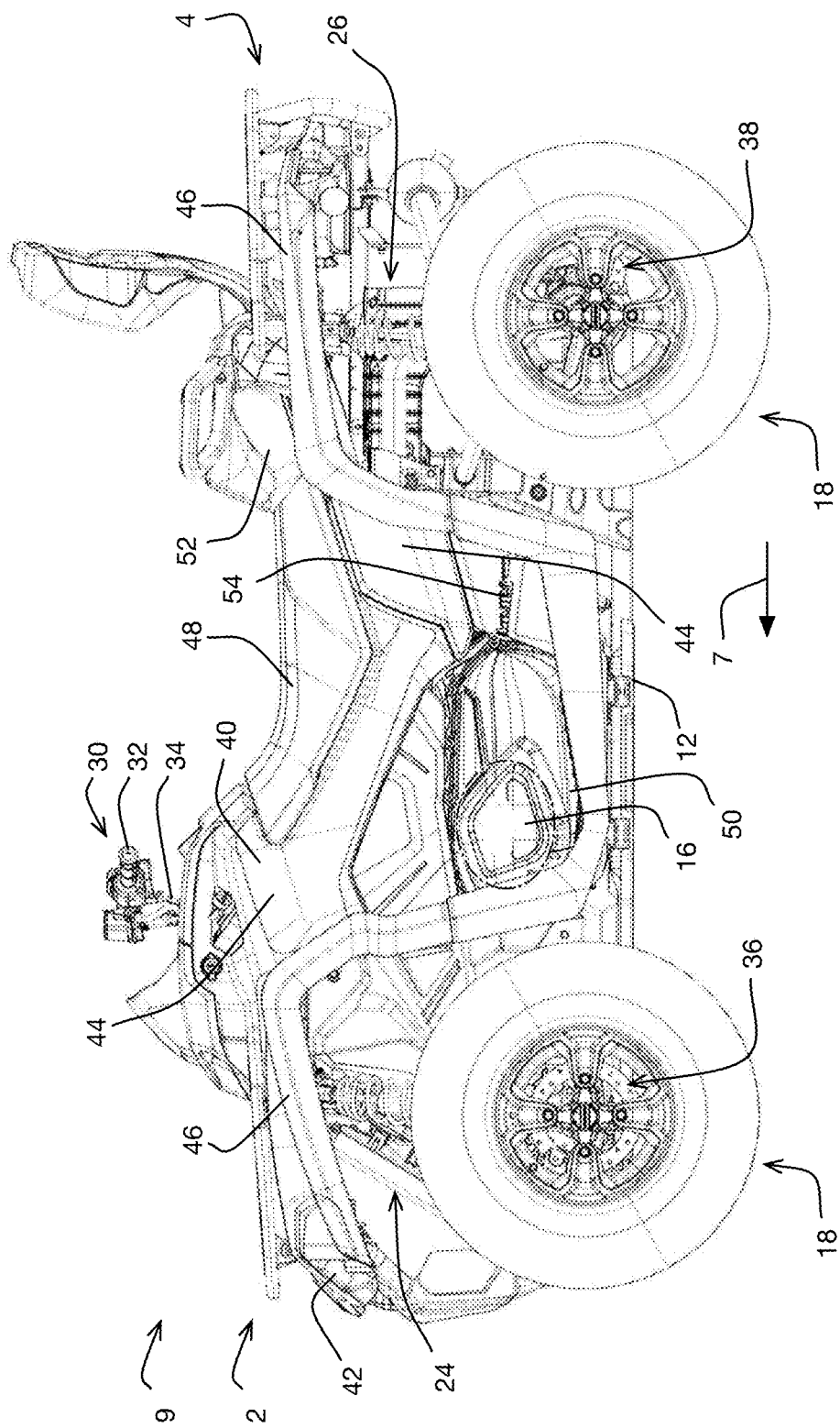
FIG. 1 is a left side elevation view of an all-terrain vehicle (ATV)

With reference to FIG. 1, the ATV 9 has a front end 2 and a rear end 4 defined consistently with a forward travel direction 7 of the ATV 9. The ATV 9 has a frame 12 to which is mounted an internal combustion engine 16 for powering the ATV 9. The engine 16 is an example of a motor. It is contemplated that the ATV 9 may be powered by other type(s) of motor(s), such as an electric motor for example.

The ATV 9 has two front wheels 18 and two rear wheels 18. The two front wheels 18 are suspended from the frame 12 by respective front suspension assemblies 24 while the two rear wheels 18 are suspended from the frame 12 by respective rear suspension assemblies 26. Each of the four wheels 18 is provided with low-pressure balloon tires adapted for off-road conditions and traversing rugged terrain. The wheels 18 are examples of ground engaging members. It is contemplated that different ground engaging members could be used.

Each of the front and rear suspension assemblies 24, 26 is an A-arm type suspension assembly. It is contemplated that the front and/or rear suspension assemblies 24, 26 could be of a different type.

The two front wheels 18 are steerable via a steering assembly 30 that is rotationally supported by the frame 12 to enable a driver to steer the ATV 9. The steering assembly 30 includes a handlebar 32 connected to a steering column 34 for actuating steering linkages (not shown) operably connected to the front left and front right wheels 18.

A power steering electric motor (not shown) is operatively connected to the steering column 34 and to the left and right front wheels 18 via the steering linkages. The power steering electric motor provides power steering which assists a driver in steering the ATV 9. It is contemplated that a different steering assembly could be used. For example, it is contemplated that a non-powered steering assembly could be used.

The handlebar 32 includes controls to enable the driver to control acceleration, braking, start/stop and other functions of the ATV 9. For braking, the ATV 9 has two front brakes 36 and two rear brakes 38. It is contemplated that a different brake system could be used.

As illustrated in FIG. 1, the ATV 9 also includes fairings 40 including a front fascia 42 at the front end 2 of the ATV 9 and several side panels 44 extending over lateral sides of the ATV 9. A fender 46 is disposed over each wheel 18 to protect the driver and/or passenger from dirt, water and other debris being projected by the rotating wheels 18.

The ATV 9 further includes a straddle seat 48 mounted to the frame 12 for accommodating a driver of the ATV 9. Another straddle seat 52 is provided behind the driver seat 48 to accommodate a passenger.

Driver footrests 50 are provided on either of the driver seat 48 and are disposed vertically lower than the driver seat 48 to support the driver's feet. A passenger footrest 54 is provided longitudinally rearward of each of the left and right driver footrests 50.

The passenger footrests 54 are disposed slightly higher than the driver footrests 50 and are designed to accommodate the feet of a passenger seated on the passenger seat 52 which is disposed slightly vertically higher than the driver seat 48. It is contemplated that the passenger seat 52 and the passenger footrests 54 could be omitted.

Figure 2:
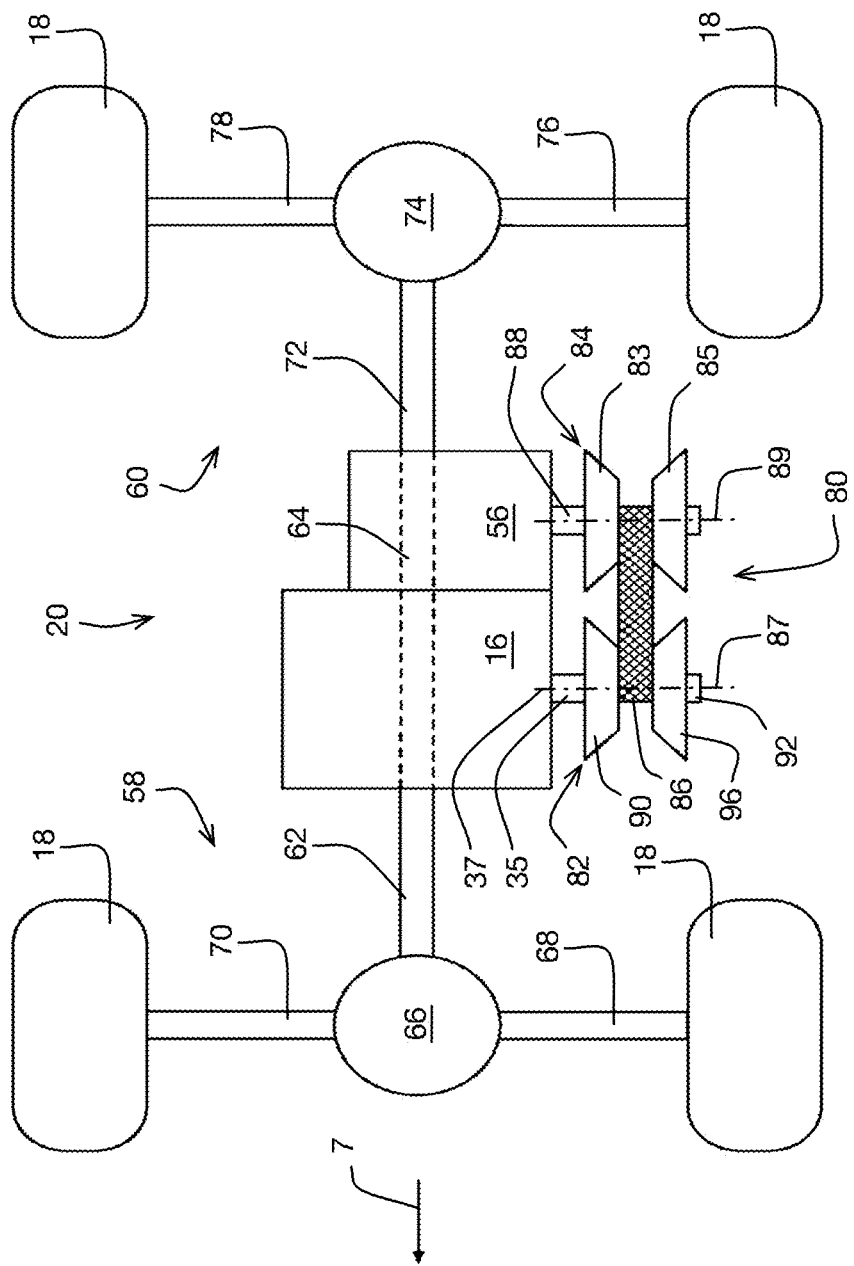
FIG. 2 is a top plan schematic layout of a drivetrain of the ATV of FIG. 1.

The engine 16 is a V-type internal combustion engine with cylinders housing reciprocating pistons (not shown) connected to a crankshaft 35. With reference to FIG. 2, the crankshaft 35 is driven (rotated) by the pistons about a crankshaft axis 37 and is coupled to a drivetrain 20 for delivering torque to the front and rear wheels 18. The drivetrain 20 can also selectively deliver torque to the wheels 18 to provide two-wheel-drive (2WD), or four-wheel-drive (4WD).

The drivetrain 20 includes a transmission 56 that is connected to a rear portion of the engine 16. The transmission 56 is preferably connected to the engine 16 with threaded fasteners (not shown), e.g. bolts, which facilitate assembly and disassembly of the transmission 56. The transmission 56 operatively connects to both a front drive system 58 and a rear drive system 60 of the ATV 9.

The front drive system 58 includes a front drive shaft 62 connected at a rearward end to the transmission 56 (i.e. to a forward end of an intermediary shaft 64 of the transmission 56) and at a forward end to a front differential 66. The front differential 66 is connected to a left front axle 68 and a right front axle 70 which are, in turn, connected to the front wheels 18 (left and right respectively).

The rear drive system 60 includes a rear drive shaft 72 connected at a forward end to the transmission 56 (i.e. to a rearward end of the intermediary shaft 64 of the transmission 56) and at a rearward end to a rear differential 74. The rear differential 74 connects to a left rear axle 76 and a right rear axle 78 which are, in turn, connected to the rear wheels 18 (left and right respectively).

The transmission 56 is driven via an input shaft 88 which is rotatable about an input shaft axis 89, and has a gearbox to reduce the angular velocity of the input shaft 88 in favor of greater torque. It is contemplated that a different transmission 56 and/or a different drive train 20 arrangement could be used.

The engine 16 and the transmission 56 are operatively connected by a CVT 80. In other words, the CVT 80 is operatively connected between the engine 16 and the wheels 18. The CVT 80 has a slider-type centrifugal drive pulley 82, a driven pulley 84, and a CVT belt 86 looped around the drive pulley 82 and the driven pulley 84 to transfer torque therebetween. It is noted that while the drive pulley 82 is described herein as being used with the ATV 9, the drive pulley 82 could also be used in other types of vehicles, including, but not limited to, snowmobiles, motorcycles, scooters, watercraft, and so on.

As shown in FIG. 2, the CVT 80 is disposed on the left side of the engine 16. It is contemplated that the CVT 80 could, for example, be disposed on the other side of the engine 16.

The drive pulley 82 is connected to the crankshaft 35 coaxially therewith to be driven (rotated) by the crankshaft 35 about a drive pulley axis 87. It is contemplated that in some embodiments, the drive pulley 82 could be non-coaxial with the crankshaft 35 and/or could be indirectly connected thereto. Accordingly, it is also contemplated that the crankshaft axis 37 and the drive pulley axis 87 could not be coaxial.

The driven pulley 84 has a moveable sheave 83 and a fixed sheave 85. The driven pulley 84 is connected to the input shaft 88 of the transmission 56 which delivers power to the transmission 56. It is contemplated that in other embodiments, the driven pulley 84 could be connected to a different component.

As will be described in more detail herein below, the CVT 80 has a "neutral" position in which the drive pulley 82 is disengaged from the CVT belt 86. In "neutral", the drive pulley 82 does not transmit torque to the CVT belt 86, and therefore does not transmit torque to the driven pulley 84.

Figure 3:
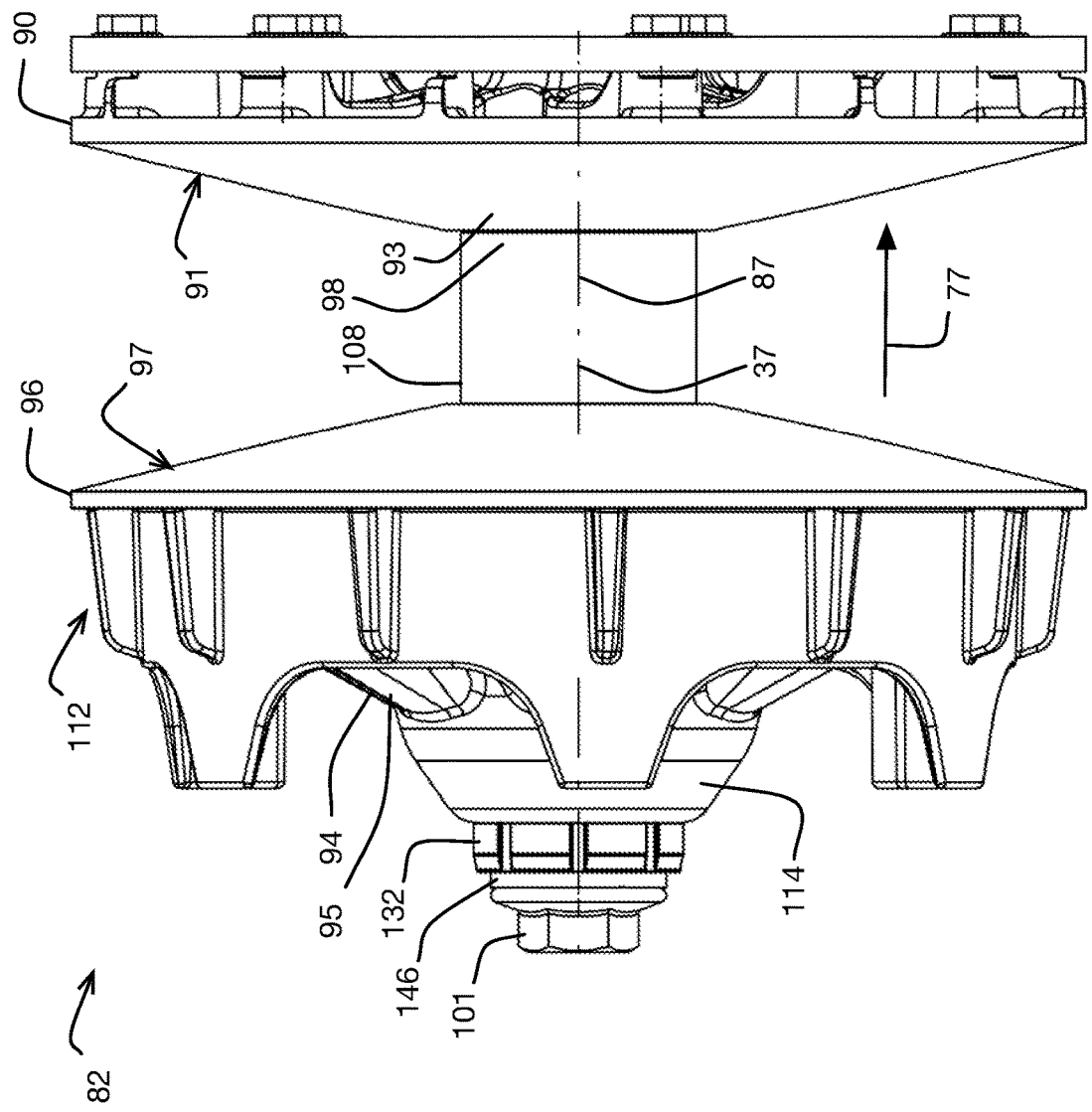
FIG. 3 is a rear elevation view of a drive pulley of a continuously variable transmission (CVT) of the ATV of FIG. 1.

The CVT 80 also has a plurality of engaged positions in which the drive pulley 82 engages and transfers power to the CVT belt 86 and the driven pulley 84. As shown in FIG. 3, for operating in the various engaged positions, the drive pulley 82 has a fixed sheave 90 and a movable sheave 96. The fixed sheave 90 is fixedly connected on a pulley shaft 92. The movable sheave 96 is slidable along the pulley shaft 92 relative to the fixed sheave 90 for opening and closing the drive pulley 82. The movable sheave 96 and the fixed sheave 90 are adapted to receive the CVT belt 86 therebetween and for applying a pinching force on the CVT belt 86.

In the "neutral" position, the movable sheave 96 is spaced from the fixed sheave 90 so it does not pinch the CVT belt 86 against the fixed sheave 90. In this position, rotation of the drive pulley 82 does not entrain the CVT belt 86 and does not transfer torque thereto.

From the "neutral" position, as the engine 16 rotationally accelerates the drive pulley 82 about the drive pulley axis 87 to above a threshold rotational speed, the drive pulley 82 begins to close and engage the CVT belt 86, thereby allowing the ATV 9 to be propelled.

As the drive pulley 82 closes (i.e. the movable sheave 96 of the drive pulley 82 moves toward the fixed sheave 90 of the drive pulley 82, in the direction shown by arrow 77 in FIG. 3), the driven pulley 84 opens (i.e. the fixed sheave 85 of the driven pulley 84 moves away from the movable sheave 83 of the driven pulley 84).

When the engine 16 slows down, the driven pulley 84 closes and the drive pulley 82 opens, until finally the CVT 80 returns to its "neutral" position when the drive pulley 82 is rotating below the threshold rotational speed.

The closing of the drive pulley 82 increases the effective radius thereof. The opening of the drive pulley 82 decreases the effective radius thereof. The closing of the driven pulley 84 increases the effective radius thereof. The opening of the driven pulley 84 decreases the effective radius thereof.

The opening and closing action of the pulleys 82, 84 accommodates for the substantially constant length of the CVT belt 86 and alters the gear ratio between the crankshaft 35 and the input shaft 88.

The driven pulley 84 is of a type known in the art and therefore its construction will not be described in more detail herein.

Referring to FIGS. 3 to 7, the drive pulley 82 will be described in more detail.

Figure 7:
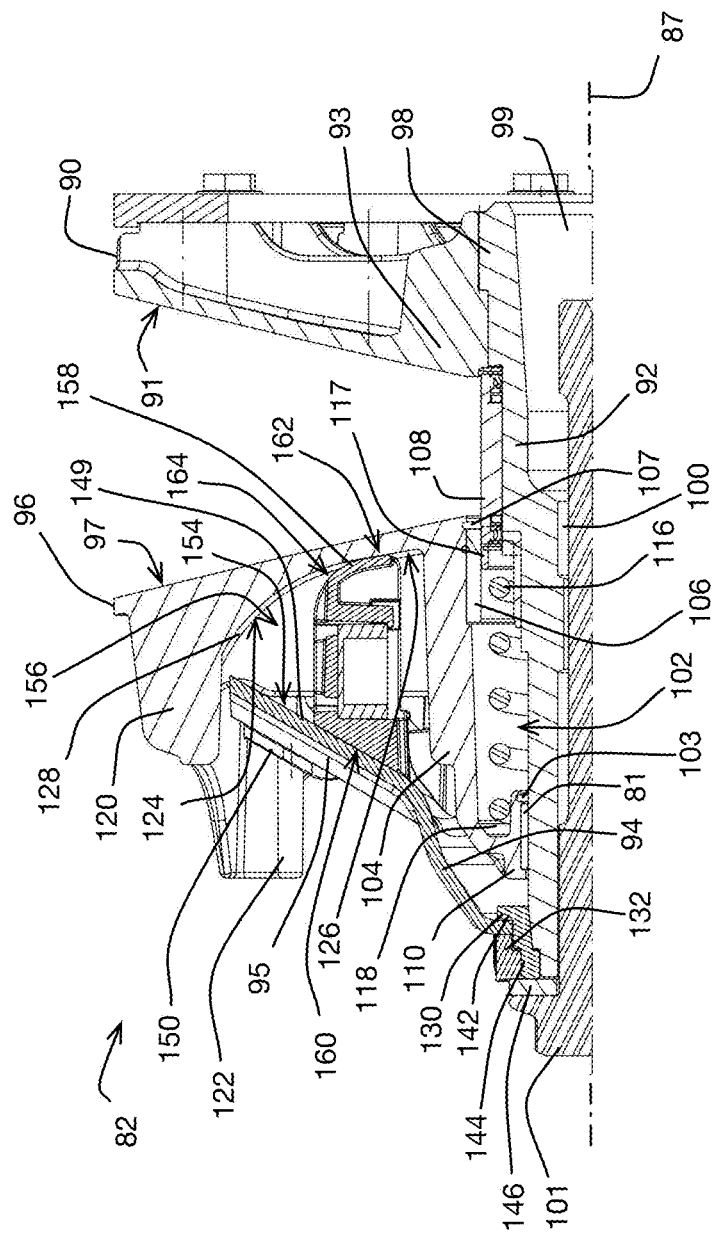
FIG. 7 is a cross-sectional view of the drive pulley of FIG. 4, taken along a section line 7-7 in FIG. 4.

The pulley shaft 92 of the drive pulley 82 is driven by the crankshaft 35. To this end, and as shown in FIG. 7, the pulley shaft 92 defines an axial crankshaft receiving cavity 99 in its right end 98.

The crankshaft receiving cavity 99 receives therein a left end of the crankshaft 35 and the pulley shaft 92 is fixed thereto as will be described in more detail herein below. The left end of the crankshaft 35 is shaped congruously with the crankshaft receiving cavity 99 for transmitting torque to the pulley shaft 92.

The fixed sheave 90, the movable sheave 96 and a back plate 94 are positioned coaxially with the pulley shaft 92 to rotate about the drive pulley axis 87. The fixed sheave 90 defines an axial aperture through a central portion 93 thereof that receives the pulley shaft 82 therethrough.

The fixed sheave 90 is press-fitted on the pulley shaft 92 so as to be axially and rotationally fixed relative to the pulley shaft 92 to be driven by the pulley shaft 92. The fixed sheave 90 has a belt contacting surface 91 for contacting and entraining the CVT belt 86.

The movable sheave 96 is positioned on a left side of the fixed sheave 90 and also has a belt contacting surface 97 for contacting and entraining the CVT belt 86. The belt contacting surface 91 of the fixed sheave 90 and the belt contacting surface 97 of the movable sheave 96 are conical and extend away from each other.

The belt contacting surface 91 and the belt contacting surface 97 define a travel path of the CVT belt 86 and the changing effective radius of the drive pulley 82 as the drive pulley 82 closes and opens.

The back plate 94 is fixedly connected on a left end of the pulley shaft 92 as will be described in greater detail below. As such, the movable sheave 96 is disposed axially between the fixed sheave 90 and the back plate 94. The fixed sheave 90, the movable sheave 96 and the back plate 94 rotate together with the pulley shaft 92.

The movable sheave 96 defines an axial aperture 102 through a central portion 104 thereof. The axial aperture 102 receives the pulley shaft 92 therethrough and permits the movable sheave 96 to slide axially over the pulley shaft 92 for closing and opening the drive pulley 82 as described herein above.

A clip 103 is received in a circumferential groove defined in a left side portion 110 of the central portion 104 and is disposed between the left side portion 110 and the pulley shaft 92. A bushing 81 is held between the clip 103 on the right and a step in the left side portion 110 on the left. The bushing 81 is disposed radially between the movable sheave 96 and the pulley shaft 92 to slide against the pulley shaft 92. The bushing 81 is provided to wear instead of the movable sheave 96.

A bushing 106 is fitted into a right end of the axial aperture 102 of the central portion 104 of the movable sheave 96. The bushing 106 is held in place by a clip 107 on the right and a step in the movable sheave 96 on the left. The bushing 106 is positioned radially between the movable sheave 96 and a bushing 108 on the pulley shaft 92. The bushing 106 slides over the bushing 108 and wears instead of the movable sheave 96. The bushing 108 is provided to wear instead of the pulley shaft 92 which would otherwise be caused by friction with the inner surface of the CVT belt 86.

Still referring to FIG. 7, a spring 116 is disposed around the pulley shaft 92 and is disposed inside the axial aperture 102 of the movable sheave 96. A right end of the spring 116 abuts a spring seat 117 fitted over the pulley shaft 92.

A left end of the spring 116 abuts the movable sheave 96, and more particularly a circumferential receiving portion 118 defined by the central portion 104 of the movable sheave 96 inside the axial aperture 102.

When the drive pulley 82 is assembled, the spring 116 is in compression and biases the movable sheave 96 away from the fixed sheave 90 toward an open position 112. When the movable sheave 96 is in its open position 112, the drive pulley 82 does not engage (i.e. pinch) the CVT belt 86 and is in the "neutral" position as described above.

The spring 116 is an example of a biasing member disposed at least partially radially between the pulley shaft 92 and the movable sheave 96 and biasing the movable sheave 96 away from the fixed sheave 90. It is contemplated that a different biasing member and/or a different number of different biasing members could be used to bias the movable sheave 96 to the open position 112.

The movable sheave 96 defines an outer sidewall 120 that extends around an outer circumference of the movable sheave 96 on a left side of the movable sheave 96, opposite the contacting surface 97.

Figure 4:
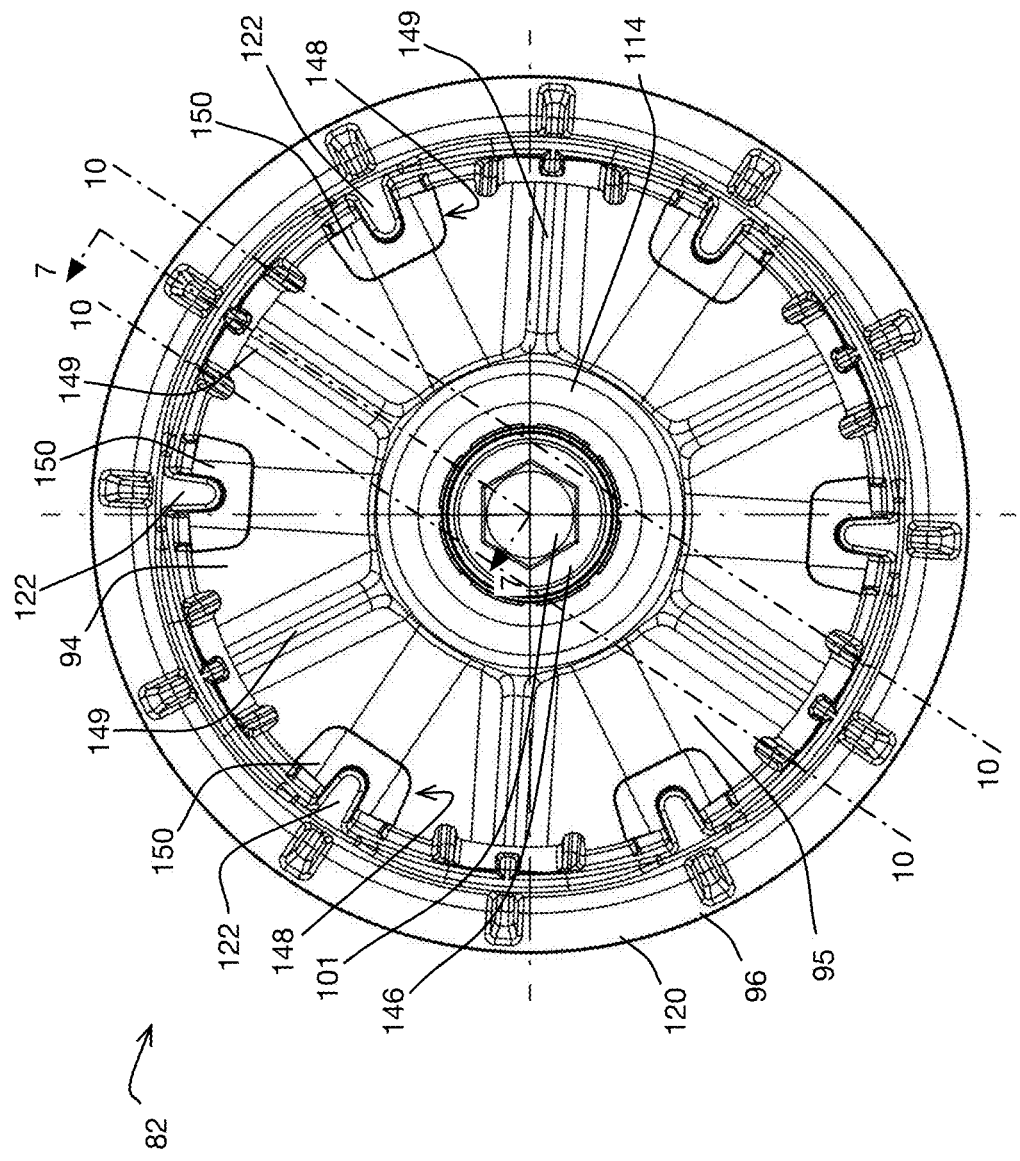
FIG. 4 is a left side elevation view of the drive pulley of FIG. 3.
Figure 5:
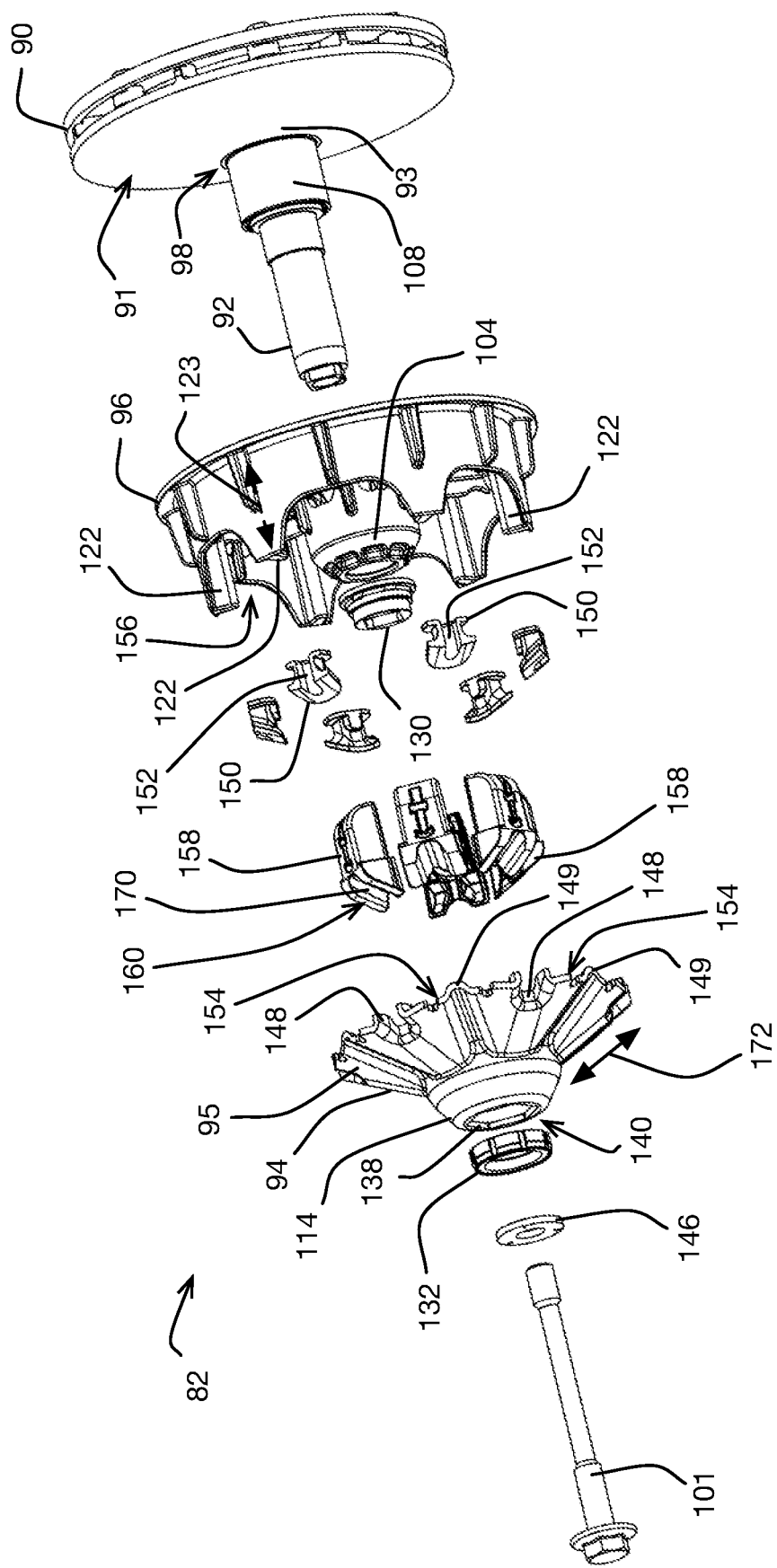
FIG. 5 is an exploded perspective view of the drive pulley of FIG. 4, taken from a rear, left, top side of the drive pulley.

As best shown in FIGS. 5 and 7, the outer sidewall 120 defines six ribs 122 (only a few of which are labeled to maintain clarity). Each of the ribs 122 extends axially and protrudes radially from a radially inner side of the outer sidewall 120. As best shown in FIG. 4, the ribs 122 are distributed circumferentially at regular intervals to help maintain balanced operation of the drive pulley 82. It is contemplated that there could be more or less than six ribs 122.

The movable sheave 96 further defines six movable sheave surfaces 124 on the left side thereof, inward of the outer sidewall 120, one of which is shown in FIG. 7. The movable sheave surfaces 124 are disposed in between corresponding pairs of the ribs 122. The movable sheave surfaces 124 extend radially away from the central portion 104 of the movable sheave 96 to the outer sidewall 120 of the movable sheave 96. As shown in FIG. 7, the movable sheave surfaces 124 also extend away from the contacting surface 91 of the fixed sheave 90 as the movable sheave surfaces 124 extend radially away from the central portion 104 of the movable sheave 96. The movable sheave surfaces 124 are distributed circumferentially around the central portion 104 of the movable sheave 96 at regular intervals to help maintain balanced operation of the drive pulley 82.

In the present embodiment, each of the movable sheave surfaces 124 is the same as the rest of the movable sheave surfaces 124. It is contemplated that the movable sheave surfaces 124 could be part of a single movable sheave surface extending circumferentially about the central portion 104 of the movable sheave 96 from the central portion 104 to the outer sidewall 120.

Figure 12:
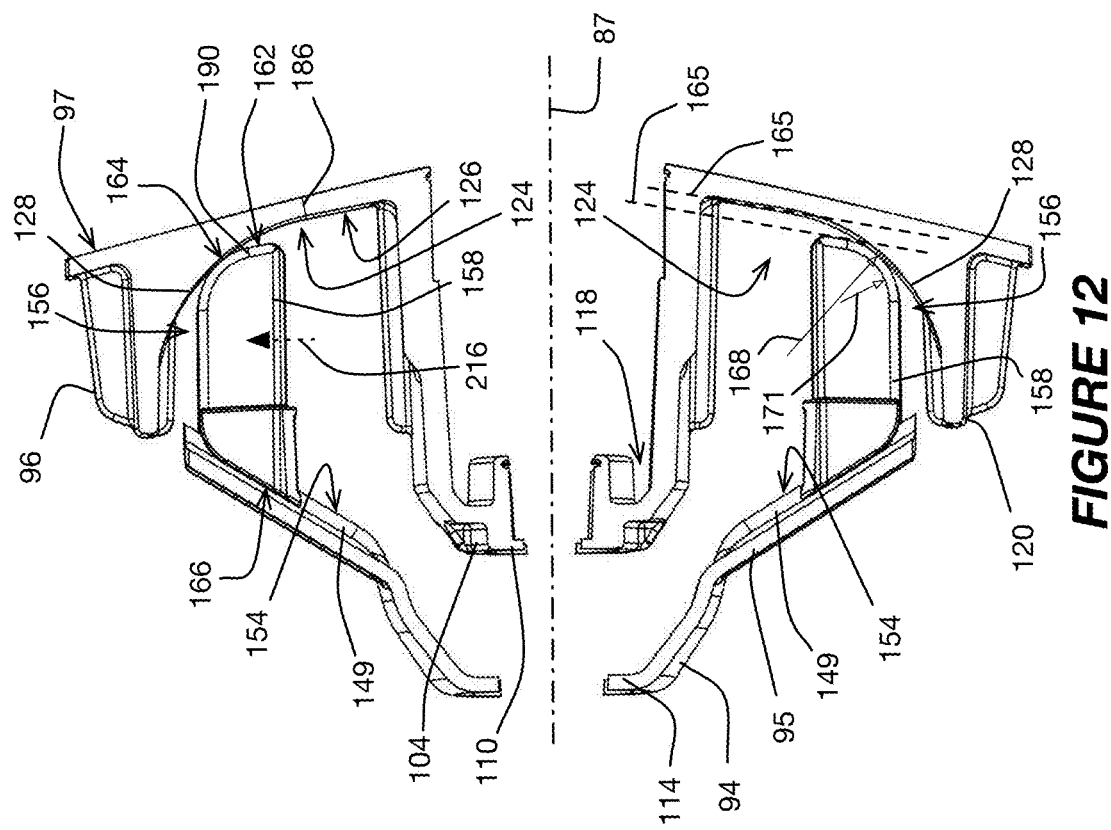
FIG. 12 is the slice of the drive pulley of FIG. 10 with both sliders of the drive pulley being shown moved past the intermediate position to a driving zone position.
Figure 13:
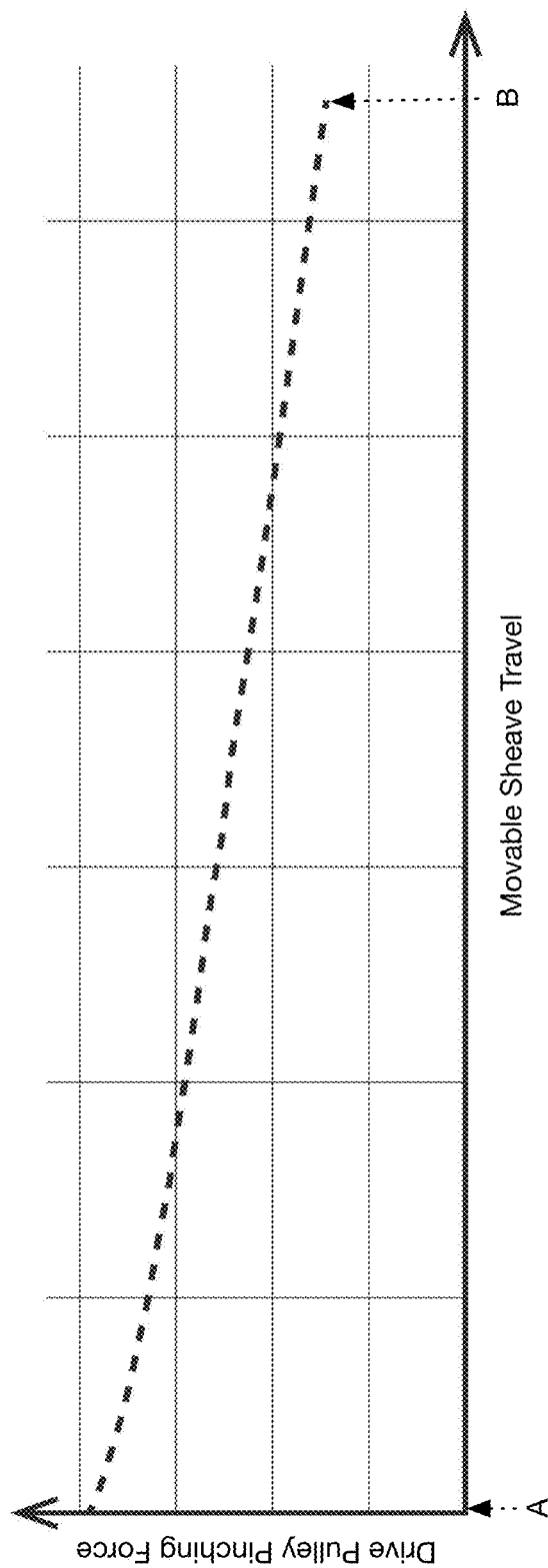
FIG. 13 is a graph of a pinching force profile of a prior art slider-type centrifugal drive pulley.

Still referring to FIG. 7, each of the movable sheave surfaces 124 has two surface portions: a flat portion 126 ("first surface portion") and a curved portion 128 ("second surface portion") axially outward from the flat portion 126. The flat portion 126 is positioned adjacent the central portion 104 of the movable sheave 96. The curved portion 128 is concave and extends radially outwardly from an outer edge of the flat portion 126 to a corresponding portion of the of the outer sidewall 120. In the present embodiment, the curved portion 128 defines an arc having a radius 168 as shown in FIG. 12. In other embodiments, the curved portion 128 has different shapes.

The flat portion 126 extends toward the back plate 94 as the flat portion 126 extends radially away from the pulley shaft 92. Similarly, the curved portion 128 extends toward the back plate 94 as the curved portion 128 extends radially away from the pulley shaft 92.

In the present embodiment, the flat portion 126 and the curved portion 128 are angled relative to the drive pulley axis 87 away from the belt contacting surface 91 of the fixed sheave 90.

Figure 6:
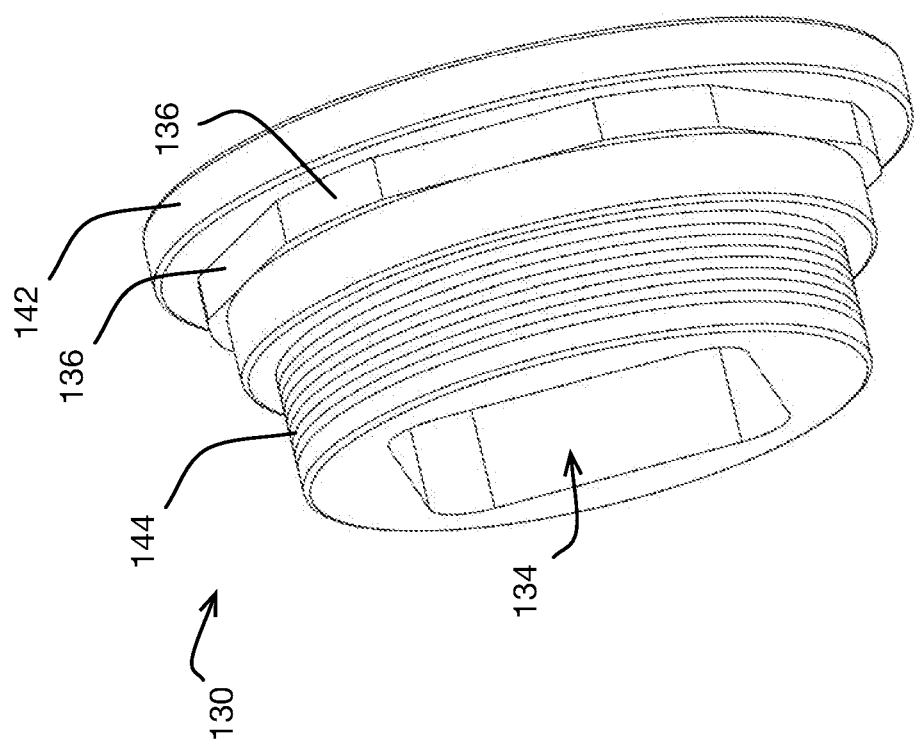
FIG. 6 is a perspective view of a collar of the drive pulley of FIG. 4, taken from a rear, left, top side of the collar.

Referring to FIGS. 5 to 7, the back plate 94 is fixedly connected on a left end of the pulley shaft 92 via a collar 130 and a nut 132. More particularly, the left end of the pulley shaft 92 has a square shape (FIG. 5). In turn, the collar 130 is generally cylindrical and defines a complementary rectangular axial aperture 134 therethrough (FIGS. 5 and 6). The square shaped left end of the pulley shaft 92 fits into the complementary rectangular axial aperture 134 of the collar 130 and thereby mates with the collar 130 to transmit torque from the engine 16 thereto. In turn, and as best shown in FIG. 6, the collar 130 defines a plurality of flat surfaces 136 disposed around an outer circumference thereof. Only two of these surfaces have been labeled to maintain clarity. The back plate 94 defines an axial aperture 138 (FIG. 5). The axial aperture 138 receives the collar 130 therein. More particularly, the axial aperture 138 of the back plate 94 is defined by a plurality of flat surfaces 140 (FIG. 5) which are complementary to the plurality of flat surfaces 136 of the collar 130. The flat surfaces 140 of the back plate 94 fit over and mate with the flat surfaces 136 of the collar 130. The collar 130 thereby mates with the back plate 94 to transmit torque from the pulley shaft 92 thereto.

As shown in FIG. 7, when the back plate 94 is fitted over the collar 130, a right side surface of a central portion 114 of the back plate 94 abuts a circumferential ledge 142 of the collar 130. The nut 132 is then threaded onto and tightened over a corresponding threaded left portion 144 of the collar 130. It is contemplated that other types of connections could be used instead of or in addition to the threaded connection. The nut 132 presses the part of the back plate 94 disposed between the nut 132 and the circumferential ledge 142 of the collar 130 against the circumferential ledge 142 and secures the back plate 94 to the collar 130.

This assembly is held together by a bolt 101 fitted with a washer 146. Still referring to FIG. 7, the pulley shaft 92 defines an axial bolt receiving aperture 100 therein. The axial bolt receiving aperture 100 extends from the left end of the pulley shaft 92 to the crankshaft receiving cavity 99. The bolt 101 is received from the left end of the pulley shaft 92, via the axial bolt receiving aperture 100, into a threaded aperture (not shown) defined in the left end of the crankshaft 35. The bolt 101 is tightened in a threaded aperture in the left end of the crankshaft 35 and thereby secures the nut 132 and the collar 130 to the pulley shaft 92, and the drive pulley 82 to the crankshaft 35. As the washer 146 abuts the nut 132, the bolt 101 and the washer 146 also prevent the nut 132 from becoming unfastened. It is contemplated that a different construction could be used to mount the drive pulley 82 to the crankshaft 35.

In a further aspect, and as best shown in FIG. 5, the back plate 94 has a generally conical part 95 which is centered about the drive pulley axis 87 and opens toward the fixed sheave 90. The conical part 95 of the back plate 94 defines six recesses 148 and six ribs 149 therein.

The recesses 148 and the ribs 149 are distributed circumferentially around the conical part of the back plate 94 at regular intervals, in an alternating fashion. This helps maintain balanced operation of the drive pulley 82. As shown in FIG. 5, each of the ribs 149 is disposed between a corresponding/neighboring pair of recesses 148. In turn, each of the recesses 148 is disposed between a corresponding/neighboring pair of ribs 149. Each of the ribs 149 extends radially outwardly from the central portion 114 of the back plate 94 to the outer circumference of the back plate 94.

Still referring to FIG. 5, each of the recesses 148 of the back plate 94 is open at its opposed left and right ends. Each of the recesses 148 is positioned in the back plate 94 and is shaped to receive a corresponding one of the ribs 122 of the movable sheave 96 therein when the drive pulley 82 is assembled. More particularly, and as best shown in FIG. 4, in the present embodiment, each of the recesses 148 is sized slightly larger than the corresponding rib 122 of the movable sheave 96 and receives a respective rubber damper 150 therein. Only a few of the rubber dampers 150 are labeled, to maintain clarity. It is contemplated that the dampers 150 could be made of a material other than rubber.

The dampers 150 are disposed between the back plate 94 and the movable sheave 96 for transferring rotational forces from the back plate 94 to the movable sheave 96. Referring to FIG. 5, each of the dampers 150 is, on one side thereof (the side facing toward the drive pulley axis 87), shaped to be inserted into and to mate with a corresponding one of the recesses 148 of the back plate 94. Each of the dampers 150, on another side thereof (the side facing away from the drive pulley axis 87), defines a recess 152 that receives a corresponding one of the ribs 122 of the movable sheave 96 therein.

When the drive pulley 82 is assembled, the ribs 122 of the movable sheave 96 slide in respective ones of the recesses 152 of the dampers 150 as the movable sheave 96 moves relative to the fixed sheave 90. Engagement, in a circumferential direction, between the ribs 122 of the movable sheave 96 and the back plate 94 is achieved via corresponding ones of the dampers 150. These engagements transmit torque from the back plate 94 to the movable sheave 96. The dampers 150 also help reduce the vibrations transmitted to the movable sheave 96 from the back plate 94 and the pulley shaft 92 during operation of the CVT 80.

In some embodiments, the dampers 150 are omitted, in which cases the recesses 148 of the back plate 94 could be shaped and dimensioned to directly mate with corresponding ones of the ribs 122 of the movable sheave 96.

As best shown in FIGS. 7 and 10 to 12, the back plate 94 further defines a plurality of back plate surfaces 154 on an inner side thereof. In the present embodiment, there are six back plate surfaces 154 (only two of which are labeled in FIG. 5, to maintain clarity). Two of the back plate surfaces 154 are visible in FIGS. 7 and 10 to 12. Each of the back plate surfaces 154 corresponds to and is disposed opposite to a respective one of the movable sheave surfaces 124. As such, the movable sheave surfaces 124 face respective ones of the back plate surfaces 154. As shown, each of the back plate surfaces 154 faces the fixed sheave 90 and extends toward the fixed sheave 90 as that back plate surface 154 extends radially away from the pulley shaft 92. Each of the back plate surfaces 154 of the back plate 94 defines a corresponding one of the ribs 149 of the back plate 94 and is symmetric about the corresponding one of the ribs 149. Each of the back plate surfaces 154 is angled relative to the drive pulley axis 87 toward the corresponding one of the movable sheave surfaces 124.

As best seen in FIGS. 4 and 5, each of the back plate surfaces 154 and each of the ribs 149 is disposed between a corresponding pair of adjacent ribs 122 of the movable sheave 96.

Referring to FIG. 7, when the drive pulley 82 is assembled, each pair of corresponding back plate surfaces 154 and movable sheave surfaces 124, together with a corresponding pair of adjacent ribs 122 delineate a space 156 therebetween. Two of these spaces 156 are visible in FIG. 10. In the present embodiment, there are six spaces 156 delineated as described herein above. The spaces 156 are disposed between the back plate 94 and the movable sheave 96, circumferentially around the central portion 104 of the movable sheave 96, at regular intervals to maintain balanced operation of the drive pulley 82.

As best shown in FIG. 5, the drive pulley 82 includes six sliders 158. Each of the six sliders 158 is disposed in a respective one of the six spaces 156, between a corresponding one of the back plate surfaces 154 and a corresponding one of the movable sheave surfaces 124. As will be described in more detail herein below, each of the sliders 158 is movable radially in response to rotation of the pulley shaft 92 between an idle position (FIG. 10), an intermediate position (FIG. 11) and a plurality of driving zone positions (an example of the driving zone positions is shown in FIG. 12). The intermediate position of a given slider 158 is radially outward from the idle position of the given slider 158. Each of the driving zone positions of the given slider 158 is radially outward from the intermediate position of the given slider 158. Movement of the sliders 158 from the idle position to the intermediate position moves the movable sheave 96 toward the fixed sheave 90. Movement of the sliders 158 from the intermediate position to the driving zone positions also moves the movable sheave 96 toward the fixed sheave 90.

In the present embodiment, each of the sliders 158 is the same as and behaves in the same way as each one of the rest of the sliders 158. Since the sliders 158 are all the same in this embodiment, only the structure and operation of the slider 158 shown at the top of FIGS. 5, 7 and 10 to 12 will be described herein in detail.

Figure 8:
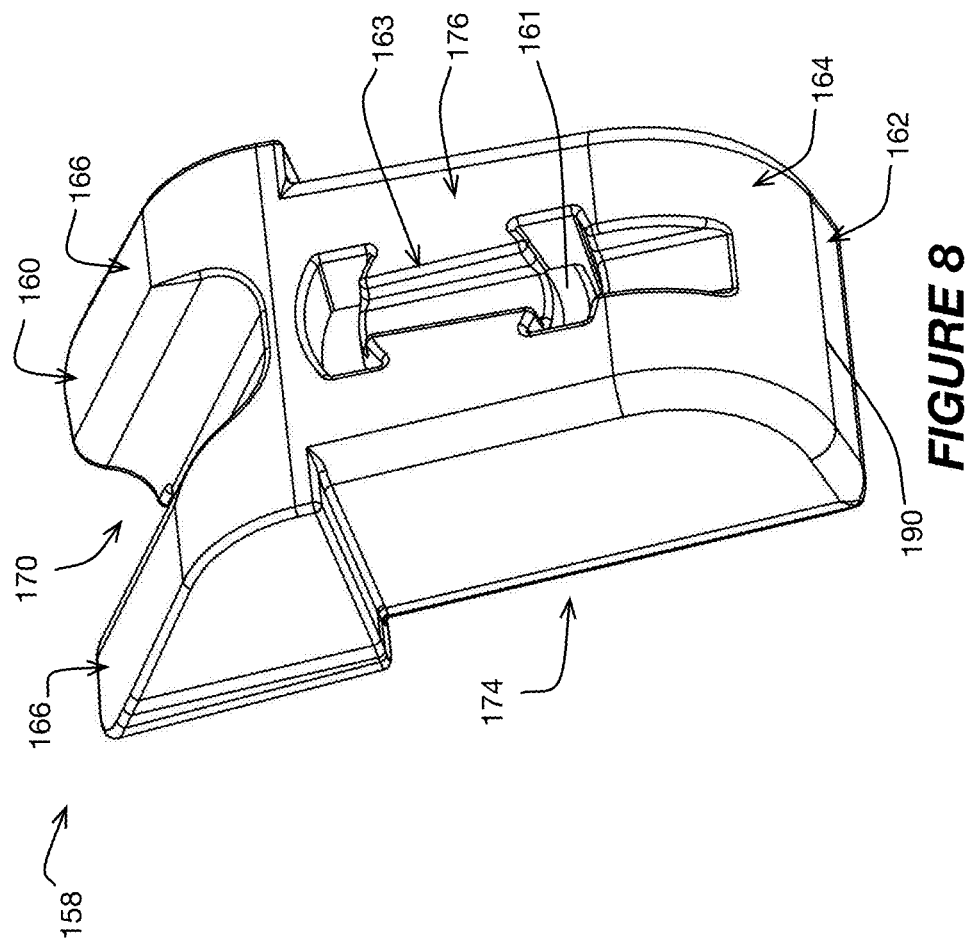
FIG. 8 is a perspective view of a slider of the drive pulley of FIG. 4, taken from a radially outward side of the slider.
Figure 9:
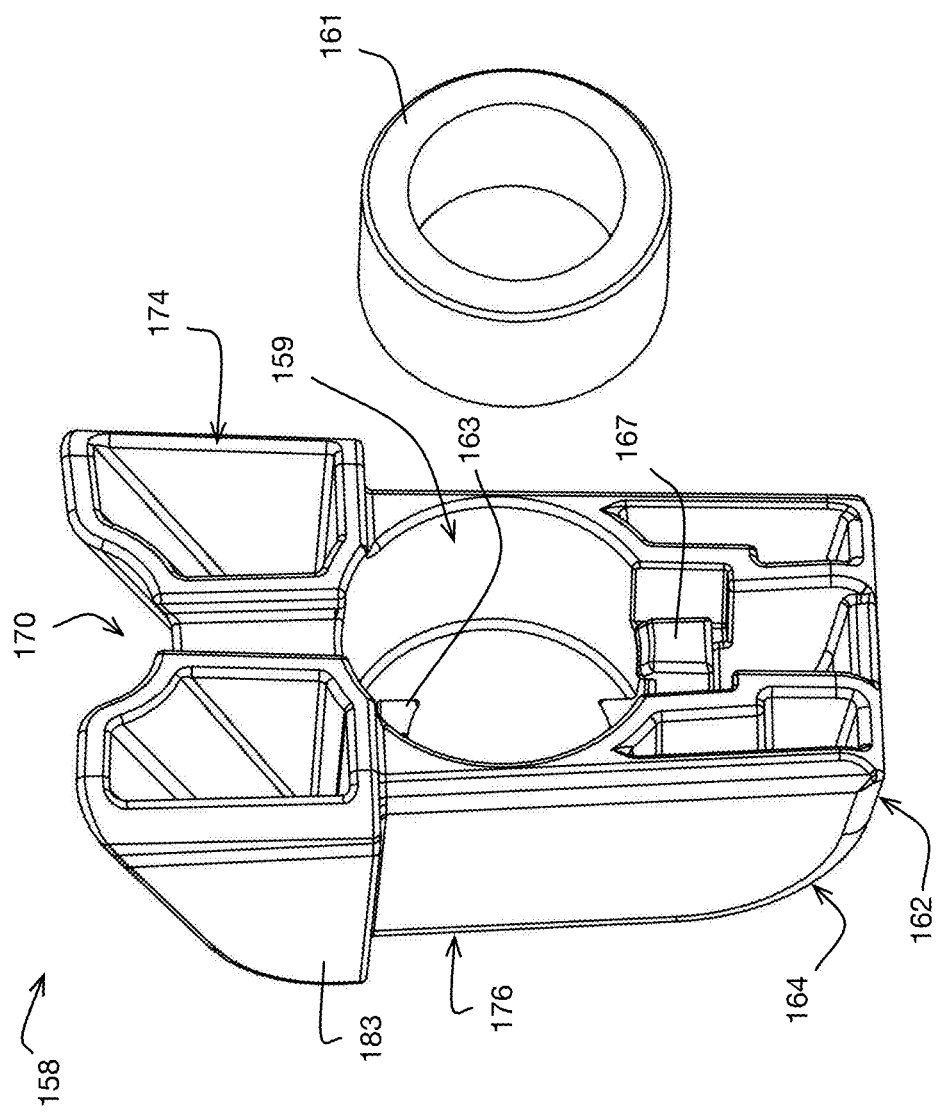
FIG. 9 is a perspective view of the slider of FIG. 8, taken from a radially inward side of the slider, with a weight of the slider being shown removed therefrom.

The slider 158 is shown in more detail in FIGS. 8 and 9. In this embodiment the slider 158 is made of Stanyl TW341, a plastic which helps reduce friction with the various surfaces of the rest of the drive pulley 82 that come in contact with the slider 158. It is contemplated that other materials could be used.

The slider 158 has a body 183 defining a back plate contacting surface 160 on a left side of the slider 158, and an engagement zone surface 162 and a curved driving zone surface 164 on the right side of the slider 158. The engagement zone surface 162 of the slider 158 is parallel to the flat portion 126 of the corresponding movable sheave surface 124 as shown with reference lines 165 in FIG. 12. In other embodiments, the engagement zone surface 162 of the slider 158 is not parallel to the flat portion 126 of the corresponding movable sheave surface 124. The curved driving zone surface 164 extends radially outward from the engagement zone surface 162

The back plate contacting surface 160 faces and contacts a corresponding one of the back plate surfaces 154. Additionally, when the slider 158 is in use, the back plate contacting surface 160 is angled so as to extend toward the fixed sheave 90 as the back plate contacting surface 160 extends radially away from the pulley shaft 92.

The engagement zone surface 162 faces a corresponding one of the movable sheave surfaces 124. When the slider 158 is in use, the engagement zone surface 162 is angled so as to extend toward the back plate 94 as the engagement zone surface 162 extends radially away from the pulley shaft 92. The driving zone surface 164 faces the corresponding one of the movable sheave surfaces 124. In this embodiment, the engagement zone surface 162 is flat and the driving zone surface 164 is curved. More particularly, the driving zone surface 164 is convex. In the present embodiment, the driving zone surface 164 defines an arc having a radius 171 as shown in FIG. 12. The radius 171 of the driving zone surface 164 is smaller than the radius 168 of the curved portion 128 of the corresponding movable sheave surface 124. In other embodiments, the driving zone surface 164 has other shapes.

The engagement zone surface 162 of the slider 158 extends from an inward side 174 of the slider 158 to an outward side 176 of the slider 158. The inward side 174 of the slider 158 faces toward the central portion 104 of the movable sheave 96 and the pulley shaft 92. The outward side 176 of the slider 158 faces away from the central portion 104 of the movable sheave 96 and the pulley shaft 92.

The driving zone surface 164 of the slider 158 extends radially away from the engagement zone surface 162 and the pulley shaft 92. The engagement zone surface 162 and the driving zone surface 164 of the slider 158 contact each other along a contact line 190. In the present embodiment, the contact line 190 is straight and is generally orthogonal to the drive pulley axis 87.

As shown in FIG. 9, the slider 158 defines therein a cylindrical weight-receiving cavity 159 on the inward side 174 of the body 183. The weight-receiving cavity 159 removably receives a cylindrical weight 161 therein. It is contemplated that the weight-receiving cavity 159 and/or the weight 161 could have different shapes.

A flexible tongue 167 extends in part into the weight-receiving cavity 159 and retains the weight 161 in the weight-receiving cavity 159. The flexible tongue 167 bends outward resiliently, toward the engagement zone surface 162, to allow for removal of the weight 161 from the weight-receiving cavity 159.

The slider 158 defines a weight-removal aperture 163 therethrough. The weight-removal aperture 163 extends from an outward side 176 of the slider 158 into the weight-receiving cavity 159. The weight-removal aperture 163 communicates with the weight-receiving cavity 159 and is sized and shaped to receive a tool, such as a screwdriver, therethrough from the outward side 176 of the slider 158, to help remove the weight 161 from the weight-receiving cavity 159 by pushing the weight 161 with the tool out of the weight-receiving cavity 159, while pulling on the tongue 167 as described above.

The weight 161 is annular in shape. Depending on the desired operating characteristics, heavier or lighter weights 161 can be used. The weight of the weight 161 depends on the dimension of the inner diameter of the annulus and on the material used to make the weight. It is contemplated that the weight 161 could have a different shape. It is also contemplated that the slider 158 could have multiple smaller recesses 159 and that the amount of weight added to the slider could be determined by the number of correspondingly sized weights are inserted in these recesses 159.

Referring to FIG. 8, the back plate contacting surface 160 of the slider 158 has two flat portions 166 and defines a recess 170 therein, centrally between the two flat portions 166. The recess 170 is open at opposite ends thereof. The recess 170 is shaped complementarily to and receives a corresponding one of the ribs 149 (FIG. 5) of the back plate 94. It is contemplated that the recess 170 of each of the sliders 158 and the ribs 149 could be omitted.

It is contemplated that the drive pulley 82 could have more or less than the six sliders 158, the six ribs 122, the six ribs 149, the six movable sheave surfaces 124, the six back plate surfaces 154, the six dampers 150, and the six recesses 148. As such, it is contemplated that the drive pulley 82 could define a different number of spaces 156.

Figure 10:
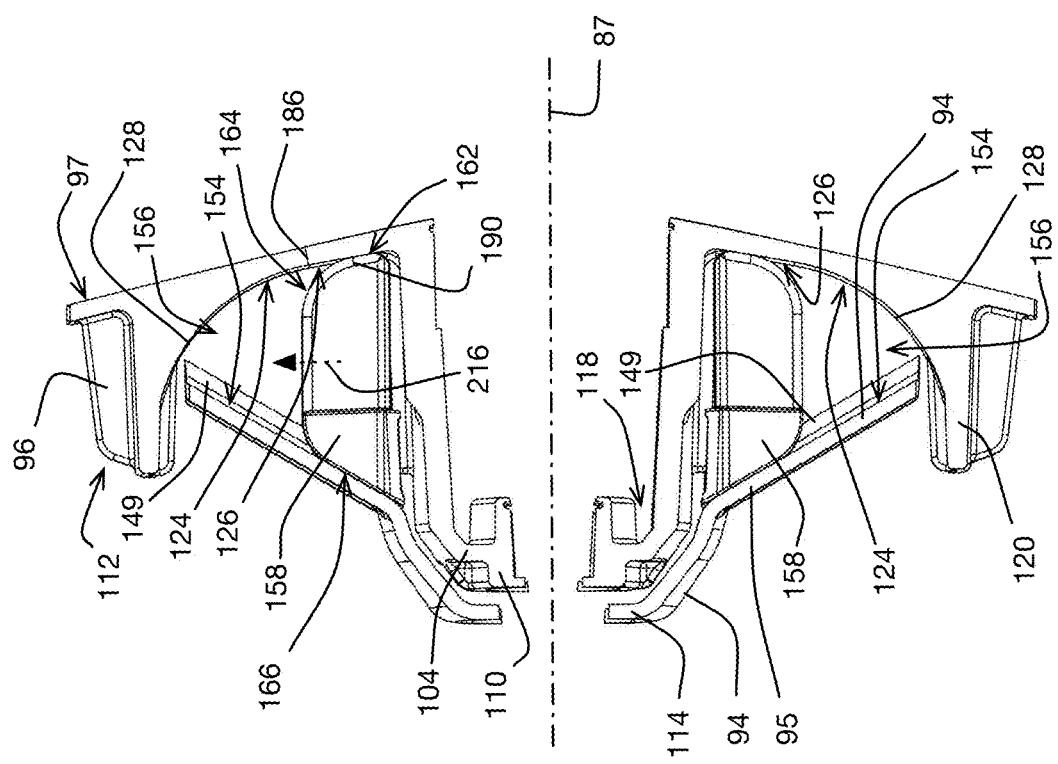
FIG. 10 is a slice of the drive pulley taken between lines 10-10 of FIG. 4, containing two opposite sliders with both sliders of the drive pulley being shown in an idle position.

Now referring to FIG. 10, when the drive pulley 82 is not rotating about the drive pulley axis 87 or is being rotated slowly about the drive pulley axis 87, by the engine 16 idling for example, the slider 158 is positioned in an idle position. In the idle position, the slider 158 is adjacent the central portion 104 of the movable sheave 96 as shown in FIG. 10. When the sliders 158 are in the idle position, the movable sheave 96 is in the open position 112.

In the present embodiment, when the movable sheave 96 is in the open position 112, the movable sheave 96 is disengaged from the CVT belt 86 and does not transfer power to the driven pulley 84.

In this position, the drive pulley 82, and the CVT 80, is in "neutral" as described herein above. It is contemplated that in other embodiments, the CVT 80 could have no "neutral". In such embodiments, the drive pulley 82 would engage the CVT belt 86 in all positions of the movable sheave 96 to transfer at least some torque to the CVT belt 86.

As shown in FIG. 10, when the slider 158 is in the idle position, the engagement zone surface 162 of the slider 158 is parallel to and contacts the flat portion 126 of the movable sheave surface 124 corresponding to the slider 158. In this position, the driving zone surface 164 of the slider 158 is out of contact with the flat portion 126 and the curved portion 128 of the corresponding movable sheave surface 124. For clarity, the boundary between the flat portion 126 and the curved portion 128 of the corresponding movable sheave surface 124 is shown with line 186.

Rotational acceleration of the drive pulley 82 about the drive pulley axis 87 to above a threshold rotational speed causes the sliders 158 to move radially from their respective idle positions, away from the pulley shaft 92. This movement of the sliders 158 pushes the movable sheave 96 along the pulley shaft 92 toward the fixed sheave 90.

More particularly, movement of the slider 158 from its idle position resulting from rotational acceleration of the drive pulley 82 causes the back plate contacting surface 156 of the slider 158 to slide along the corresponding back plate surface 154 radially away from the pulley shaft 92. This movement also causes the engagement zone surface 162 or the driving zone surface 164 of the slider 158 to slide along the corresponding movable sheave surface 124 radially away from the pulley shaft 92 as will be described below.

The sliders 158 are pressed against the back plate 94 by the spring 116 acting on the movable sheave 96. More particularly, the spring 116 pushes the movable sheave 96 toward the back plate 94 and the movable sheave 96 pushes the sliders 158 against the back plate 94. This ensures that the back plate contacting surfaces 160 of the sliders 158 slide along and remain in contact with the corresponding back plate surfaces 154 of the back plate 94 as the movable sheave 96 moves relative to the back plate 94 and the fixed sheave 90.

As the back plate contacting surfaces 160 of the sliders 158 slide along the corresponding back plate surfaces 154 of the back plate 94, the recesses 170 of the sliders 158 slide along the corresponding ribs 149 of the back plate 94. The ribs 149 help maintain the slider 158 aligned along a linear travel path. In other words, the ribs 149 guide the sliders 158 along the corresponding back plate surfaces 154 as the sliders 158 slide along to the corresponding back plate surfaces 154.

As the movable sheave 96 starts to be moved by the sliders 158 along the pulley shaft 92 from the open position 112 toward the fixed sheave 90, the movable sheave 96 starts pinching the CVT belt 86 against the fixed sheave 90. As a result, the drive pulley 92 starts entraining the CVT belt 86 and transferring torque thereto.

Figure 14:
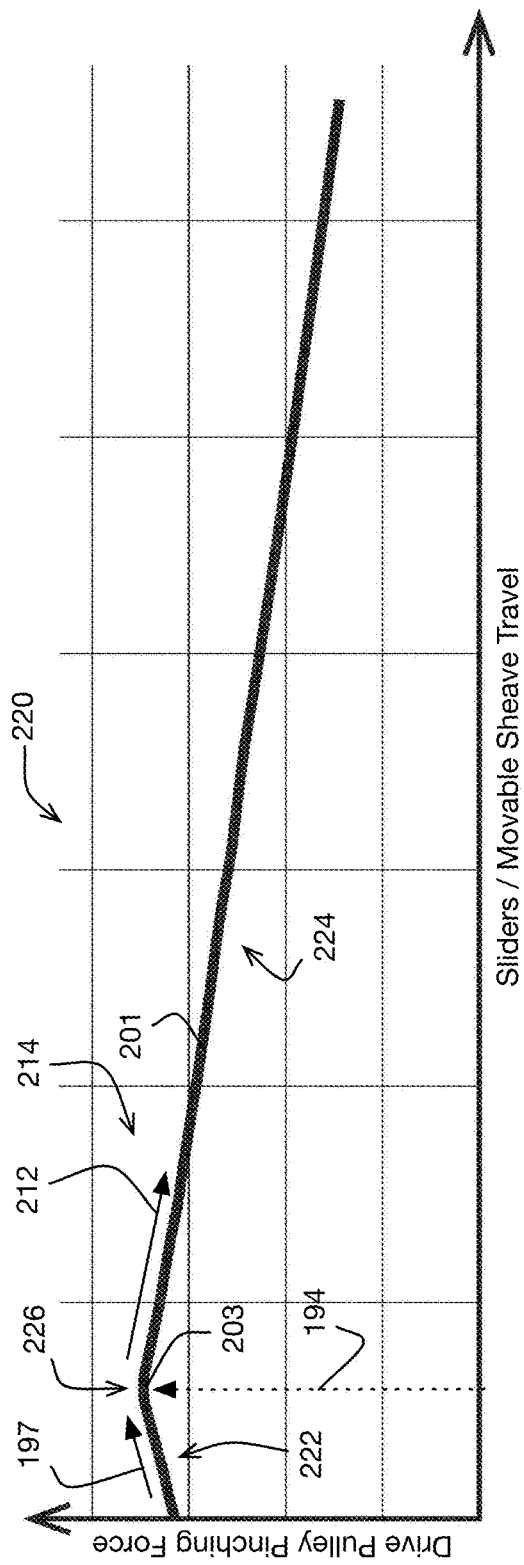
FIG. 14 is a graph of a pinching force profile of the drive pulley of FIG. 4.

As the movable sheave 96 continues to be moved by the sliders 158 toward the fixed sheave 90, the pinching force that the movable sheave 96 applies to CVT belt 86 against the fixed sheave 90 increases, as shown with arrow 197 in FIG. 14.

Figure 11:
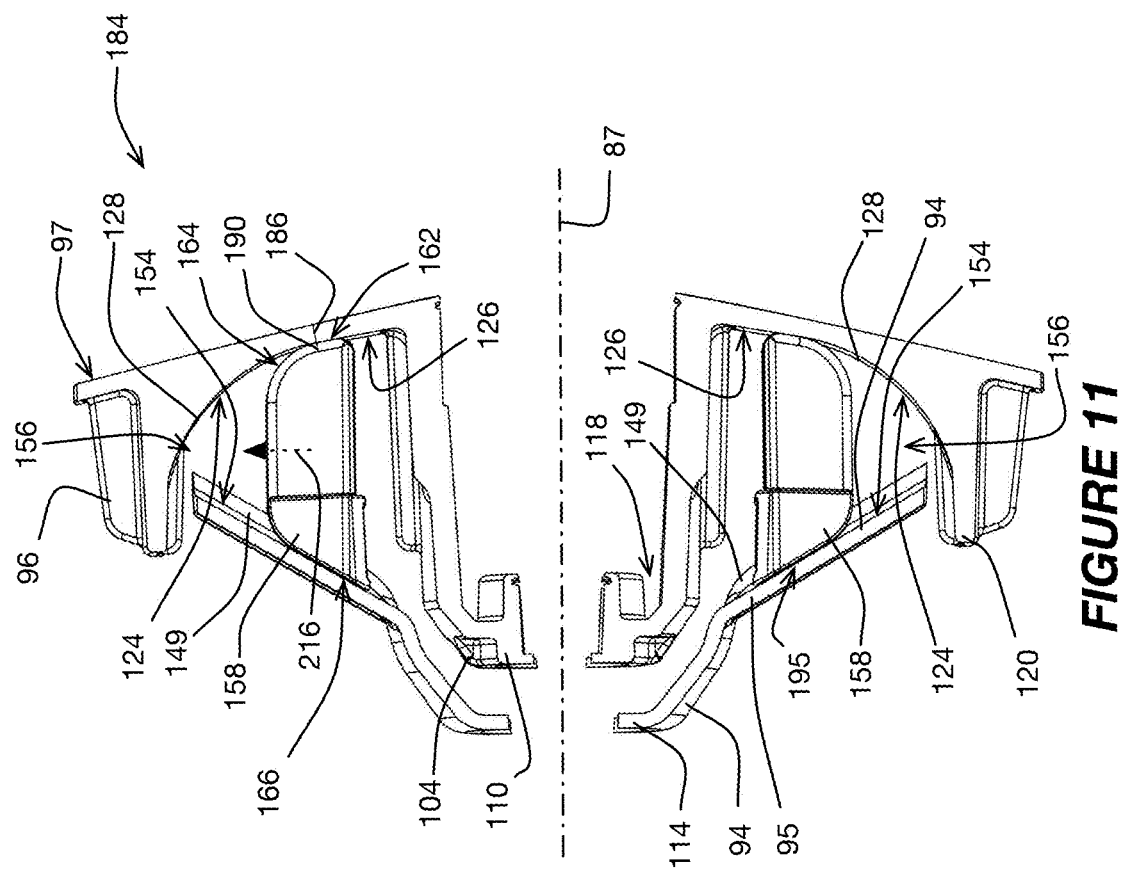
FIG. 11 is the slice of the drive pulley of FIG. 10 with both sliders of the drive pulley being shown in an intermediate position.

The pinching force 201 increases until the sliders 158 reach an intermediate position. The intermediate position of the slider 158 is shown in FIG. 11. At this point, the pinching force 201 applied by the movable sheave 96 to the CVT belt 86 against the fixed sheave 90 is at a maximum, as shown with reference numeral 203 in FIG. 14.

As the slider 158 moves from the idle position to the intermediate position, the engagement zone surface 162 of the slider 158 contacts and slides along the flat portion 126 of the corresponding movable sheave surface 124. When the slider 158 reaches the intermediate position, shown in FIG. 11, the engagement zone surface 162 of the slider 158 at line 190 reaches an inner edge of the curved portion 128 of the corresponding movable sheave surface 124 at line 186.

The driving zone surface 164 of the slider 158 is shaped and sized relative to the engagement zone surface 162 of the slider 158 such that the driving zone surface 164 is out of contact with the corresponding movable sheave surface 124 when the slider 158 is between its idle position and its intermediate position.

As the sliders 158 move farther away from their respective idle positions and past their respective intermediate positions into driving zone positions, the curved driving zone surfaces 164 of the sliders 158 start sliding along the corresponding curved portions 128 of the movable sheave surfaces 124, the flat engagement zone surfaces 162 of the sliders 158 come out of contact with the corresponding ones of the flat portions 126 of the movable sheave surfaces 124, and the movable sheave 96 continues to be moved by the sliders 158 even farther toward the fixed sheave 90. An example of a driving zone position of the sliders 158 is shown in FIG. 12.

As the sliders 158 move into the driving zone positions, the pinching force that the movable sheave 96 applies to CVT belt 86 against the fixed sheave 90 starts to decrease, as shown with arrow 212 in FIG. 14. The rate at which the pinching force decreases will depend on the shape of both the driving zone surfaces 164 and movable sheave surfaces 124. Both the driving zone surfaces 164 of the sliders 158 and the movable sheave surfaces 124 can be modified to provide a desired pinching force profile. The engagement zone surfaces 162 of the sliders 158 can also be modified to provide a desired pinching force profile, either in addition to or instead of modifying the driving zone surfaces 164.

In summary, the drive pulley 82 of the present technology provides a pinching force profile 220 as shown in FIG. 14. The pinching force profile 220 has a first section 222 in which the pinching force increases, and a second section 224 in which the pinching force decreases. The second section 224 follows the first section 222, forming a peak 226 therebetween, as shown.

In the present embodiment, each of the sliders 158 has a single flat engagement zone surface 162 as described herein above. It is contemplated that the sliders 158 could have a plurality of flat engagement zone surfaces. In some such embodiments, the engagement zone surfaces could be at different angles with each other to provide a pinching force profile provide having one or more corresponding vertices in addition to the peak 226, and one or more corresponding sections in addition to the sections 222 and 224.

With reference to FIG. 12, as the slider 158 continues moving along the corresponding movable sheave surface 124 past the intermediate position, the engagement zone surface 162 of the slider 158 comes out of contact with the flat portion 126 of the corresponding movable sheave surface 124. Instead, the driving zone surface 164 of the slider 158 starts contacting and sliding along the curved portion 128 of the corresponding movable sheave surface 124.

The driving zone surface 164 of the slider 158 is shaped and sized relative to the engagement zone surface 162 of the slider 158 such that the engagement zone surface 162 of the slider 158 is out of contact with the corresponding movable sheave surface 124 when the slider 158 moves radially away from the central portion 104 of the movable sheave 96 past its intermediate position into the driving zone positions. In other words, the engagement zone surface 162 of the slider 158 is out of contact with the movable sheave surface 124 when the slider 158 is between the intermediate position and any of the driving zone positions. This further movement of the slider 158 is shown with arrow 216 in FIG. 12.

As the slider 158 continues moving past its intermediate position as shown with arrow 216, the slider 158, and more particularly the driving zone surface 164, slides along and is in contact with the curved portion 128 of the corresponding movable sheave surface 124. When the drive pulley 82 slows down, the spring 116 pushes the movable sheave 96 away from the fixed sheave 90 and toward the back plate 94. The spring 116 thereby pushes the slider 158 back toward the pulley shaft 92 toward idle position.

Different vehicles, and different embodiments and models of the ATV 9 for example, may require the drive pulley 82 to provide a different pinching force profile for smooth operation. Changing a length of the engagement zone surface 162 of the sliders 158 adjusts both: a) an initial increase in the pinching force 201 as the drive pulley 82 starts to engage the CVT belt 86 from the "neutral" position, and b) the location of the inflection point at which the pinching force 201 starts to decrease. The location of the inflection point can also be referred to as the location of an apex of the pinching force profile 214.

Changing the angle of the engagement zone surface 162 of the slider 158 and the flat portion 126 of the corresponding movable sheave surface 124 of the movable sheave 96 relative to the direction of the centrifugal force 216 (FIG. 12) acting on the slider 158 while the drive pulley 82 is rotating also changes the pinching force profile. Changing the mass of the weight 161 of the sliders 158 proportionally changes the magnitude of the pinching force 201 corresponding to each given position of the sliders 158 and the movable sheave 96. Changing the spring 116 to one having another biasing force shifts the pinching force profile 214 up or down to proportionally change the magnitude of the pinching force 201 corresponding to each given position of the sliders 158 and the movable sheave 96. Changing the curvature of the curved portions 128 of the movable sheave surfaces 124 of the movable sheave 96 changes the pinching force profile. Changing the angle of the back plate surfaces 154 of the back plate 94 and the angle of the back plate contacting surfaces 160 of the sliders 158 relative to the direction of the centrifugal force 216 changes the pinching force profile.

Figure 15:
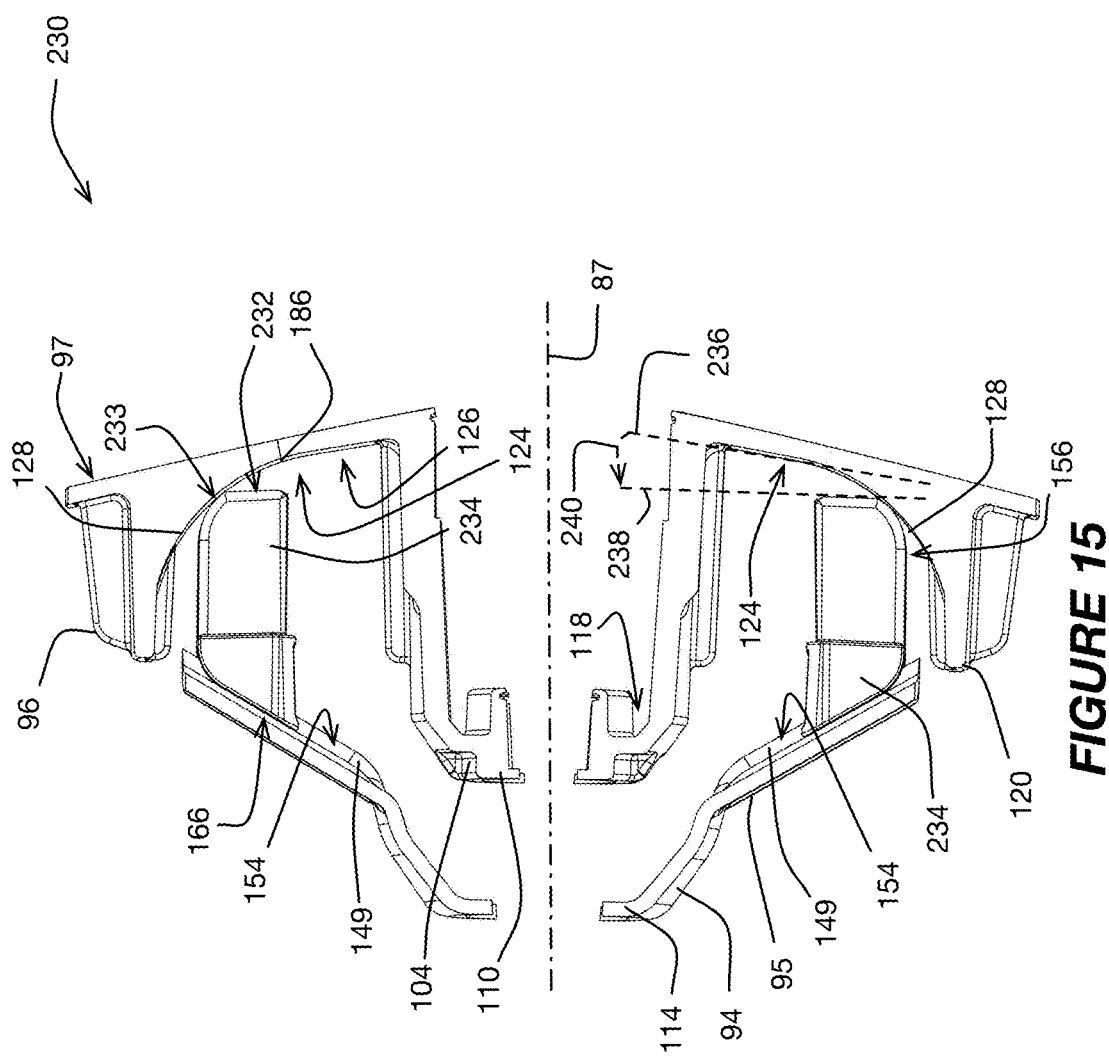
FIG. 15 is a slice of a drive pulley of a CVT according to another embodiment.

In some embodiments, additional aspects of the drive pulley 82 could be changed, while still providing for a pinching force profile having at least one first portion in which the pinching force increases, at least one peak at which the pinching force is at its maximum, and at least one second portion at which the pinching force decreases. A drive pulley 230, which is one such alternative embodiment of the drive pulley 82 is shown in FIG. 15 and described below.

The drive pulley 230 is similar to the drive pulley 82. To maintain clarity, only some parts of the drive pulley 230 are shown in FIG. 15. Also, for simplicity, parts of the drive pulley 230 that correspond to those of the drive pulley 82 have been labeled with the same reference numerals. One difference of the drive pulley 230 is that the flat engagement zone surfaces 232 of the sliders 234 thereof are longer than the flat engagement zone surfaces 162 of the drive pulley 82. Also, the curved driving zone surfaces 233 of the drive pulley 230 are shorter than the curved driving zone surfaces 164 of the drive pulley 82. Another difference is that the flat engagement zone surfaces 232 of the sliders 234 are not parallel to the flat portions 126 of the corresponding movable sheave surfaces 124. The angle between one of the flat engagement zone surfaces 232 and a corresponding one of the movable sheave surfaces 124 is shown with reference planes 236 and 238 and arrow 240. The drive pulley 230 provides a pinching force profile with a single peak, similar to the pinching force profile 220 of the drive pulley 82.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A drive pulley for a continuously variable transmission (CVT), the drive pulley comprising:
    a pulley shaft;
    a fixed sheave fixedly connected on the pulley shaft;
    a back plate fixedly connected on the pulley shaft, the back plate including a back plate surface facing the fixed sheave;
    a movable sheave disposed on the pulley shaft axially between the back plate and the fixed sheave, the movable sheave having a movable sheave surface facing the back plate surface, the movable sheave surface having a first surface portion and a second surface portion axially outward from the first surface portion, the movable sheave being slidable along the pulley shaft,
    the fixed sheave, the movable sheave and the back plate being rotatable together with the pulley shaft;
    a biasing member biasing the movable sheave away from the fixed sheave; and
    a slider disposed between the back plate surface and the movable sheave surface, the slider having a back plate contacting surface contacting the back plate surface, a flat engagement zone surface, and a curved driving zone surface extending radially outward from the engagement zone surface,
    the slider being movable radially in response to rotation of the pulley shaft between a first position, a second position and a third position, the second position being radially outward from the first position, the third position being radially outward from the second position, movement of the slider from the first position to the second position moving the movable sheave toward the fixed sheave, movement of the slider from the second position to the third position moving the movable sheave toward the fixed sheave, when the slider moves between the first and second positions:
- the back plate contacting surface of the slider slides along the back plate surface of the back plate, and
- the engagement zone surface of the slider slides along the first surface portion of the movable sheave surface of the movable sheave; and when the slider moves between the second and third positions:
- the back plate contacting surface of the slider slides along the back plate surface of the back plate, and
- the driving zone surface of the slider slides along the second surface portion of the movable sheave surface of the movable sheave.

2. The drive pulley of claim 1, wherein the driving zone surface of the slider is out of contact with the movable sheave surface when the slider is between the first position and the second position.

3. The drive pulley of claim 1, wherein the engagement zone surface of the slider is out of contact with the movable sheave surface when the slider is between the second position and the third position.

4. The drive pulley of claim 1, wherein:
the first surface portion of the movable sheave surface is a flat portion;
the second surface portion of the movable sheave surface is a curved portion; and
the curved portion extends toward the back plate as the curved portion extends radially away from the pulley shaft.

5. The drive pulley of claim 4, wherein the engagement zone surface of the slider is parallel to the flat portion of the movable sheave surface.

6. The drive pulley of claim 4, wherein:
the back plate surface extends toward the fixed sheave as the back plate surface extends radially away from the pulley shaft;
the back plate contacting surface of the slider extends toward the fixed sheave as the back plate contacting surface extends radially away from the pulley shaft;
the engagement zone surface of the slider extends toward the back plate as the engagement zone surface extends radially away from the pulley shaft; and
the flat portion of the movable sheave surface extends toward the back plate as the flat portion extends radially away from the pulley shaft.

7. The drive pulley of claim 1, wherein:
the movable sheave and the fixed sheave are adapted to receive a belt therebetween and for applying a pinching force on the belt;
the pinching force increasing as the slider moves from the first position to the second position; and
the pinching force decreasing as the slider moves from the second position to the third position.

8. The drive pulley of claim 1, wherein the slider defines a cavity therein and has a weight removably received in the cavity.

9. The drive pulley of claim 8, wherein the slider defines an aperture therein, the aperture communicating with the cavity and being sized to receive a tool therein for pushing the weight out of the cavity.

10. The drive pulley of claim 1, wherein:
the back plate defines a radially extending rib extending along the back plate surface;
the slider defines a recess in the back plate contacting surface of the slider; and
the rib is received in the recess, the rib guiding the slider along the back plate surface as the slider slides along the back plate surface.

11. The drive pulley of claim 1, further comprising a damper disposed between the back plate and the movable sheave for transferring rotational forces from the back plate to the movable sheave.

12. The drive pulley of claim 11, wherein:
the damper is a plurality of dampers, each damper of the plurality of dampers defining a recess;
the back plate defines a plurality of recesses, each recess of the plurality of recesses of the back plate receiving a corresponding damper of the plurality dampers therein; and
the movable sheave defining a plurality of ribs, each rib of the plurality of ribs of the movable sheave being received in the recess of a corresponding one of the plurality of dampers, the plurality of dampers sliding relative to the plurality of ribs of the movable sheave as the movable sheave moves along the pulley shaft.

13. The drive pulley of claim 1, wherein the driving zone surface of the slider is convex and the second surface portion of the movable sheave surface is concave.

14. The drive pulley of claim 1, wherein the biasing member is a spring disposed around the pulley shaft and disposed at least partially radially between the pulley shaft and the movable sheave.

15. The drive pulley of claim 1, wherein:
the slider is a plurality of sliders, the plurality of sliders being distributed circumferentially about the pulley shaft;
the movable sheave surface is a plurality of movable sheave surfaces, the plurality of movable sheave surfaces being distributed circumferentially about the pulley shaft;
the back plate surface is a plurality of back plate surfaces, the plurality of back plate surfaces being distributed circumferentially about the pulley shaft;
each slider of the plurality of sliders is disposed between a corresponding back plate surface of the plurality of back plate surfaces and a corresponding movable sheave surface of the plurality of movable sheave surfaces.

16. A continuously variable transmission (CVT) comprising:
the drive pulley of claim 1;
a driven pulley; and
a CVT belt looped around the drive pulley and the driven pulley to transfer torque therebetween.

17. A vehicle, comprising:
a motor;
at least one ground engaging member; and
the CVT of claim 16, the CVT being operatively connected between the motor and the at least one ground engaging member.

18. A slider for a drive pulley of a continuously variable transmission (CVT), comprising:
a body having a:
an inward side;
an outward side;
a back plate contacting surface for contacting a back plate surface of a back plate of the drive pulley, the back plate contacting surface extending from the inward side toward the outward side, the back plate contacting surface defining a recess for receiving a rib extending along the back plate surface, the rib guiding the slider along the back plate surface as the slider slides along the back plate surface;
a flat engagement zone surface for contacting a movable sheave of the drive pulley, the flat engagement zone surface being opposite the back plate contacting surface and extending from the inward side toward the outward side and toward the back plate contacting surface; and
a curved driving zone surface extending from the engagement zone surface to the outward side and toward the back plate contacting surface.

19. The slider of claim 18, wherein the slider defines a cavity in the body thereof, and the slider comprises a weight removably received in the cavity.

20. The slider of claim 18, wherein the slider defines an aperture therein, the aperture communicating with the cavity and being sized to receive a tool therein for pushing the weight out of the cavity.

\* \* \* \* \*

UNITED STATES PATENT AND TRADEMARK OFFICE
CERTIFICATE OF CORRECTION

PATENT NO.        : 11,396,930 B2
APPLICATION NO.   : 16/555737
DATED             : July 26, 2022
INVENTOR(S)       : Xavier-Pierre Aitcin et al.

Page 1 of 1

It is certified that error appears in the above-identified patent and that said Letters Patent is hereby corrected as shown below:

In the Claims

Column 20, Line 22, Claim 12 should read: --damper of the plurality of dampers--

Signed and Sealed this
Twenty-fifth Day of July, 2023

Katherine Kelly Vidal
*Director of the United States Patent and Trademark Office*